US006278992B1

(12) United States Patent
Curtis et al.

(10) Patent No.: US 6,278,992 B1
(45) Date of Patent: Aug. 21, 2001

(54) SEARCH ENGINE USING INDEXING METHOD FOR STORING AND RETRIEVING DATA

(76) Inventors: John Andrew Curtis, 6001 Killbury-Huber Rd., Plain City, OH (US) 43064; Gordon Frank Scherer, 1190 S. Sunbury Rd., Westerville, OH (US) 43081

( * ) Notice: Subject to any disclaimer, the term of this patent is extended or adjusted under 35 U.S.C. 154(b) by 0 days.

(21) Appl. No.: 09/251,882

(22) Filed: Feb. 17, 1999

Related U.S. Application Data

(63) Continuation-in-part of application No. 08/937,990, filed on Sep. 26, 1997, now abandoned, which is a continuation of application No. 08/904,405, filed on Jul. 31, 1997, now abandoned.
(60) Provisional application No. 60/041,403, filed on Mar. 19, 1997.

(51) Int. Cl.$^7$ .................................................. G06F 17/30
(52) U.S. Cl. .................. 707/3; 707/2; 707/100; 707/103; 707/500; 707/513
(58) Field of Search .................. 707/3, 103, 10, 707/2, 100, 500, 513

(56) References Cited

U.S. PATENT DOCUMENTS

| 5,359,724 | * | 10/1994 | Earle | 707/205 |
| 5,774,660 | * | 6/1998 | Brendel et al. | 395/200.31 |
| 5,848,409 | * | 12/1998 | Ahn | 707/3 |
| 5,864,863 | * | 1/1999 | Burrows | 707/103 |

* cited by examiner

*Primary Examiner*—Jack Choules
*Assistant Examiner*—Cheryl Lewis
(74) *Attorney, Agent, or Firm*—Standley & Gilcrest LLP

(57) ABSTRACT

A Search Engine utilizing a method and system for efficient storage and retrieval of data. The system comprises a record file, an index file, a duplicate segment file and access to a network of computers. The index files contains locations of data items, pointers to other index files, or an empty designation. The index files are arrays that contain locations corresponding to a predetermined range of characters with which the data items may be formed. Data items are stored according to the character strings of each data item. The first portion of a data object is indexed according to the indexing method of the present invention while a second portion of the data object is indexed according to another known database technology, such as B-tree.

46 Claims, 38 Drawing Sheets

| String[Pos] | 3 | 2 | 2 | 0 |
|---|---|---|---|---|
| | String[0] | String[1] | String[2] | String[3] |

FIG-6B

| Index[String] | TC | UNKN | 0 | 1 | 2 | 3 | 4 | 5 | 6 | 7 | 8 | 9 |
|---|---|---|---|---|---|---|---|---|---|---|---|---|
| | 0 | 0 | 0 | 0 | 0 | 0 | 0 | 0 | 0 | 0 | 0 | 0 |
| | Index[0] | Index[1] | Index[2] | Index[3] | Index[4] | Index[5] | Index[6] | Index[7] | · | · | · | ·Index[11] |

FIG-6C

| Alphabetic Mask | | Number Mask | |
|---|---|---|---|
| TC | → 0 | TC | → 0 |
| UNKN | → 1 | UNKN | → 1 |
| 'a' or 'A' | → 2 | '0' | → 2 |
| 'b' or 'B' | → 3 | '1' | → 3 |
| 'c' or 'C' | → 4 | '2' | → 4 |
| 'd' or 'D' | → 5 | '3' | → 5 |
| 'e' or 'E' | → 6 | '4' | → 6 |
| 'f' or 'F' | → 7 | '5' | → 7 |
| 'g' or 'G' | → 8 | '6' | → 8 |
| 'h' or 'H' | → 9 | '7' | → 9 |
| 'i' or 'I' | → 10 | '8' | → 10 |
| 'j' or 'J' | → 11 | '9' | → 11 |
| 'k' or 'K' | → 12 | | |
| 'l' or 'L' | → 13 | | |
| 'm' or 'M' | → 14 | | |
| 'n' or 'N' | → 15 | | |
| 'o' or 'O' | → 16 | | |
| 'p' or 'P' | → 17 | | |
| 'q' or 'Q' | → 18 | | |
| 'r' or 'R' | → 19 | | |
| 's' or 'S' | → 20 | | |
| 't' or 'T' | → 21 | | |
| 'u' or 'U' | → 22 | | |
| 'v' or 'V' | → 23 | | |
| 'w' or 'W' | → 24 | | |
| 'x' or 'X' | → 25 | | |
| 'y' or 'Y' | → 26 | | |
| 'z' or 'Z' | → 27 | | |

| Index #1 | | | New Index #2 | | |
|---|---|---|---|---|---|
| 0 | 0 | =TC | 0 | 0 | |
| 1 | 0 | =UNKN | 1 | 0 | |
| 2 | 0 | ='0' | 2 | 1 | ← Replace with FULL |
| 3 | -2 | ='1' ← Swap FULL with POINTER  *112* | 3 | 0 | *114* |
| 4 | 0 | ='2' | 4 | 0 | |
| 5 | 2 | ='3' | 5 | 0 | |
| 6 | 0 | ='4' | 6 | 0 | |
| 7 | 0 | ='5' | 7 | 0 | |
| 8 | 0 | ='6' | 8 | 0 | |
| 9 | 0 | ='7' | 9 | 0 | |
| 10 | 0 | ='8' | 10 | 0 | |
| 11 | 0 | ='9' | 11 | 0 | |

| Index 1 | | | Copy of Index #2 | | |
|---|---|---|---|---|---|
| 0 | 0 | =TC | 0 | 0 | |
| 1 | 0 | =UNKN | 1 | 0 | |
| 2 | 0 | ='0' | 2 | 1 | |
| 3 | -2 | ='1' | 3 | 0 | |
| 4 | 0 | ='2' | 4 | 0 | |
| 5 | 2 | ='3' | 5 | 3 | ← Replace with position *116* |
| 6 | 0 | ='4' | 6 | 0 | |
| 7 | 0 | ='5' | 7 | 0 | |
| 8 | 0 | ='6' | 8 | 0 | |
| 9 | 0 | ='7' | 9 | 0 | |
| 10 | 0 | ='8' | 10 | 0 | |
| 11 | 0 | ='9' | 11 | 0 | |

FIG-18

| Index | Value | Label |
|---|---|---|
| 0 | 0 | =TC |
| 1 | 0 | =UNKN |
| 2 | 1 | ='0' ← Value=1 or FULL |
| 3 | 0 | ='1' |
| 4 | 4 | ='2' |
| 5 | 0 | ='3' |
| 6 | 0 | ='4' |
| 7 | 3 | ='5' |
| 8 | 0 | ='6' |
| 9 | 0 | ='7' |
| 10 | 0 | ='8' |
| 11 | 0 | ='9' |

134  Index #2

| Index | Value |
|---|---|
| 0 | 0 |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |

New Index Index #3
136

| Index | Value | Label |
|---|---|---|
| 0 | 0 | =TC |
| 1 | 0 | =UNKN |
| 2 | −3 | ='0' ← Swap FULL with POINTER |
| 3 | 0 | ='1' |
| 4 | 4 | ='2' |
| 5 | 0 | ='3' |
| 6 | 0 | ='4' |
| 7 | 3 | ='5' |
| 8 | 0 | ='6' |
| 9 | 0 | ='7' |
| 10 | 0 | ='8' |
| 11 | 0 | ='9' |

138  Index #2

| Index | Value |
|---|---|
| 0 | 0 |
| 1 | 0 |
| 2 | 1 | ← Replace with FULL
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |

140
New Index Index #3

FIG-22

|   |   |   |
|---|---|---|
| 0 | 0 | =TC |
| 1 | 0 | =UNKN |
| 2 | 1 | ='0' ← Value=1 or FULL |
| 3 | 0 | ='1' |
| 4 | 0 | ='2' |
| 5 | 0 | ='3' Index #3 |
| 6 | 0 | ='4' |
| 7 | 0 | ='5' |
| 8 | 0 | ='6' |
| 9 | 0 | ='7' |
| 10 | 0 | ='8' |
| 11 | 0 | ='9' |

142

|   |   |
|---|---|
| 0 | 0 |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |

New Index
Index #4

144

|   |   |   |
|---|---|---|
| 0 | 0 | =TC |
| 1 | 0 | =UNKN |
| 2 | −4 | ='0' ← Swap FULL with POINTER |
| 3 | 0 | ='1' |
| 4 | 0 | ='2' |
| 5 | 0 | ='3' Index #3 |
| 6 | 0 | ='4' |
| 7 | 0 | ='5' |
| 8 | 0 | ='6' |
| 9 | 0 | ='7' |
| 10 | 0 | ='8' |
| 11 | 0 | ='9' |

146

|   |   |
|---|---|
| 0 | 1 | ← Replace with FULL
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |

148

New Index
Index #4

FIG-23

Top table

| Index | Value | Label | | New Duplicate Duplicate #1 | |
|---|---|---|---|---|---|
| 0 | 1 | =TC | ← Value =1 | 0 | Count 152 |
| 1 | 0 | =UNKN | or FULL 150 | Undefined | Pointer to Last |
| 2 | 0 | ='0' | | 0 | Sorted Flag |
| 3 | 0 | ='1' | | Undefined | Addresses |
| 4 | 0 | ='2' | | Undefined | ● |
| 5 | 0 | ='3' | Index #4 | Undefined | |
| 6 | 0 | ='4' | | Undefined | ● |
| 7 | 0 | ='5' | | Undefined | |
| 8 | 0 | ='6' | | Undefined | ● |
| 9 | 0 | ='7' | | Undefined | |
| 10 | 0 | ='8' | | Undefined | |
| 11 | 0 | ='9' | | Undefined | Pointer to Next |

Bottom table

| Index | Value | Label | | New Duplicate Duplicate #1 | |
|---|---|---|---|---|---|
| 0 | −1 | =TC | ← Swap Full with | 2 | Count 156 |
| 1 | 0 | =UNKN | POINTER to | Undefined | Pointer to Last |
| 2 | 0 | ='0' | new Duplicate | 0 | Sorted Flag |
| 3 | 0 | ='1' | 154 | 1 | Addresses 158 |
| 4 | 0 | ='2' | | 5 | ● |
| 5 | 0 | ='3' | Index #4 | Undefined | |
| 6 | 0 | ='4' | | Undefined | ● |
| 7 | 0 | ='5' | | Undefined | |
| 8 | 0 | ='6' | | Undefined | ● |
| 9 | 0 | ='7' | | Undefined | |
| 10 | 0 | ='8' | | Undefined | |
| 11 | 0 | ='9' | | Undefined | Pointer to Next |

FIG-24

| | | |
|---|---|---|
| 0 | 0 | =TC |
| 1 | 0 | =UNKN |
| 2 | 0 | ='0' |
| 3 | -2 | ='1' |
| 4 | 0 | ='2' |
| 5 | 2 | ='3' |
| 6 | 0 | ='4' |
| 7 | 0 | ='5' |
| 8 | 0 | ='6' |
| 9 | 0 | ='7' |
| 10 | 0 | ='8' |
| 11 | 0 | ='9' |

160

='2' ← Value =0 or EMPTY
Return no records

Index #1

FIG-25

| Index | Value | Label |
|---|---|---|
| 0 | 0 | = TC |
| 1 | 0 | = UNKN |
| 2 | 0 | = '0' |
| 3 | −2 | = '1' ← Value = −2 or POINTER |
| 4 | 0 | = '2' |
| 5 | 2 | = '3' Index #1 |
| 6 | 0 | = '4' |
| 7 | 0 | = '5' |
| 8 | 0 | = '6' |
| 9 | 0 | = '7' |
| 10 | 0 | = '8' |
| 11 | 0 | = '9' |

162

| Index | Value |
|---|---|
| 0 | 0 |
| 1 | 0 |
| 2 | −3 |
| 3 | 0 |
| 4 | 4 |
| 5 | 0 |
| 6 | 0 |
| 7 | 3 |
| 8 | 0 |
| 9 | 0 |
| 10 | 0 |
| 11 | 0 |

Get Index Index #2
163

| Index | Value | Label |
|---|---|---|
| 0 | 0 | = TC |
| 1 | 0 | = UNKN |
| 2 | −3 | = '0' ← Value = −2 or POINTER |
| 3 | 0 | = '1' |
| 4 | 4 | = '2' |
| 5 | 0 | = '3' Index #2 |
| 6 | 0 | = '4' |
| 7 | 3 | = '5' |
| 8 | 0 | = '6' |
| 9 | 0 | = '7' |
| 10 | 0 | = '8' |
| 11 | 0 | = '9' |

164

| Index | Value |
|---|---|
| 0 | 0 |
| 1 | 0 |
| 2 | −4 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |

Get Index Index #3
166

FIG-26

| | | |
|---|---|---|
| 0 | 0 | = TC |
| 1 | 0 | = UNKN |
| 2 | -4 | = '0' ← Value =-4 |
| 3 | 0 | = '1' or POINTER |
| 4 | 0 | = '2' 168 |
| 5 | 0 | = '3' Index #3 |
| 6 | 0 | = '4' |
| 7 | 0 | = '5' |
| 8 | 0 | = '6' |
| 9 | 0 | = '7' |
| 10 | 0 | = '8' |
| 11 | 0 | = '9' |

| | | |
|---|---|---|
| 0 | -1 | |
| 1 | 0 | |
| 2 | 0 | |
| 3 | 0 | |
| 4 | 0 | Get Index |
| 5 | 0 | Index #4 |
| 6 | 0 | 170 |
| 7 | 0 | |
| 8 | 0 | |
| 9 | 0 | |
| 10 | 0 | |
| 11 | 0 | |

| | | |
|---|---|---|
| 0 | -1 | = TC ← Get Duplicate |
| 1 | 0 | = UNKN 172 |
| 2 | 0 | = '0' |
| 3 | 0 | = '1' |
| 4 | 0 | = '2' |
| 5 | 0 | = '3' Index #4 |
| 6 | 0 | = '4' |
| 7 | 0 | = '5' |
| 8 | 0 | = '6' |
| 9 | 0 | = '7' |
| 10 | 0 | = '8' |
| 11 | 0 | = '9' |

Duplicate #1

| | |
|---|---|
| 2 | Count |
| Undefined | Pointer to Last |
| 0 | Sorted Flag |
| 1 | Addresses |
| 5 | ● |
| Undefined | |
| Undefined | ● |
| Undefined | |
| Undefined | ● |
| Undefined | Pointer to Next |

Return 2 records not sorted with positions 1 and 5.
174

FIG-27

| | |
|---|---|
| 0 | 0 | = TC
| 1 | 0 | = UNKN
| 2 | 0 | = '0'
| 3 | -2 | = '1'
| 4 | 0 | = '2'
| 5 | 2 | = '3' ← Value = 2 or FULL 176
| 6 | 0 | = '4'
| 7 | 0 | = '5'
| 8 | 0 | = '6'
| 9 | 0 | = '7'
| 10 | 0 | = '8'
| 11 | 0 | = '9'

Return records with position 2 or "300"

Index #1

FIG-28

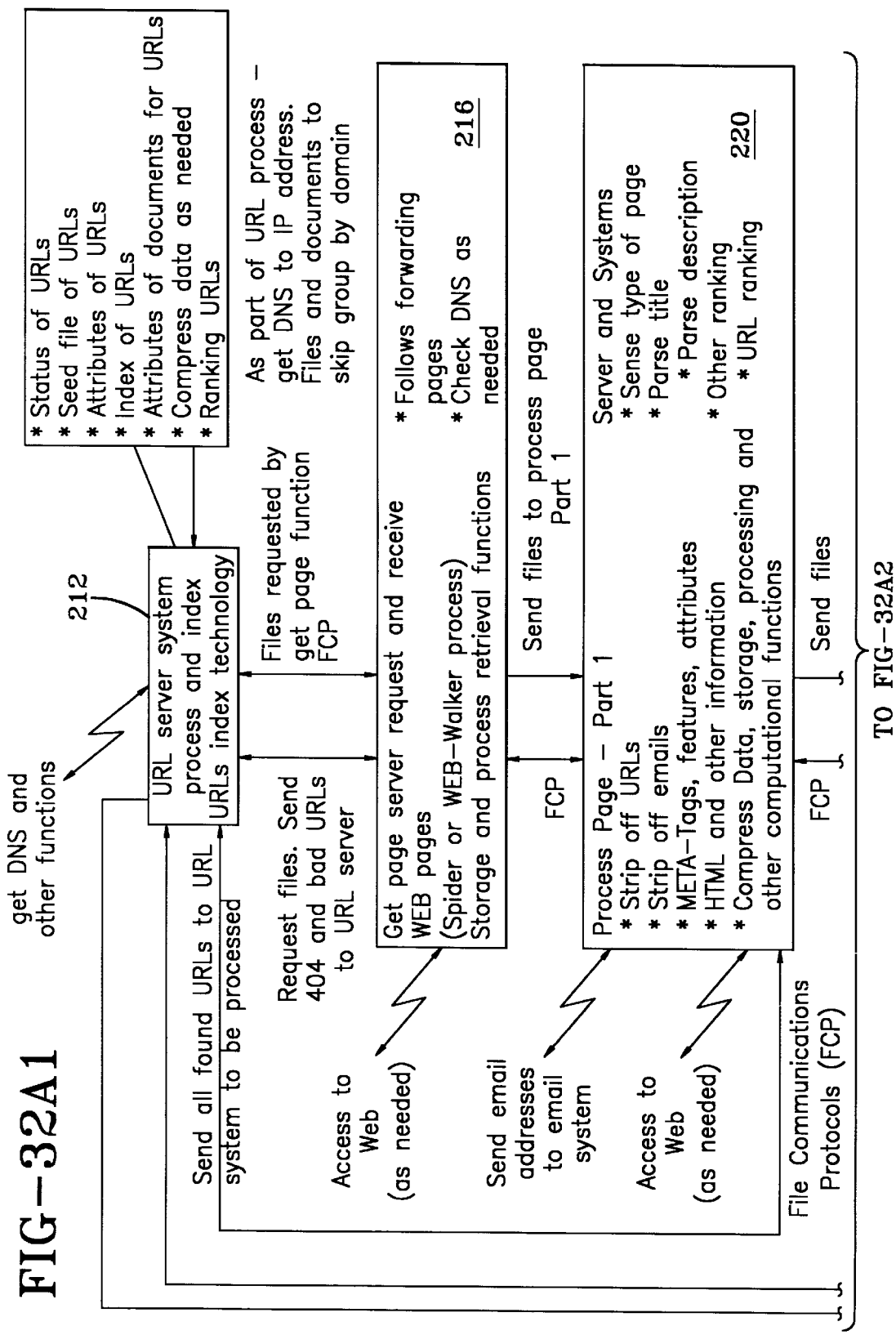
FIG-32A1

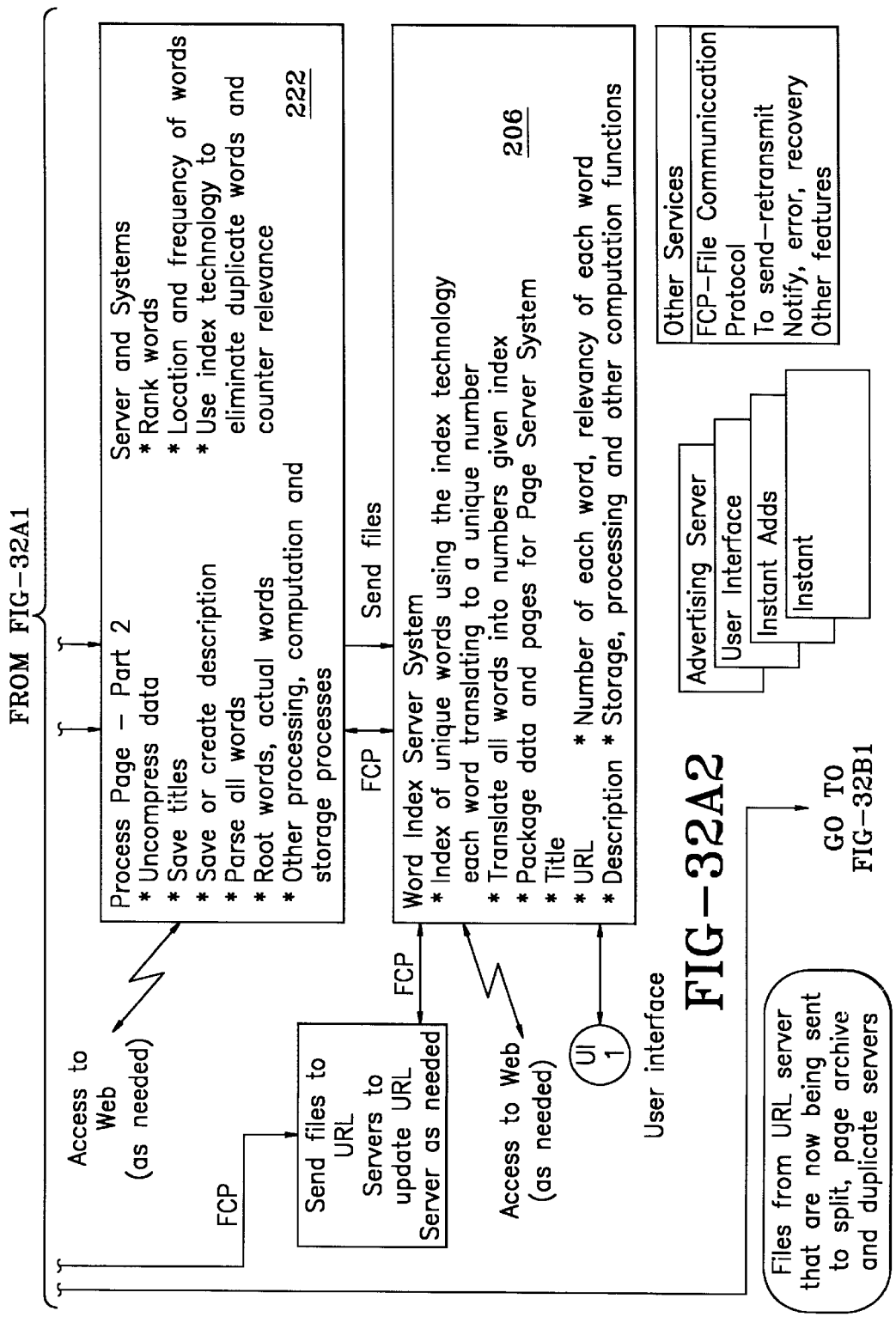
FIG-32A2

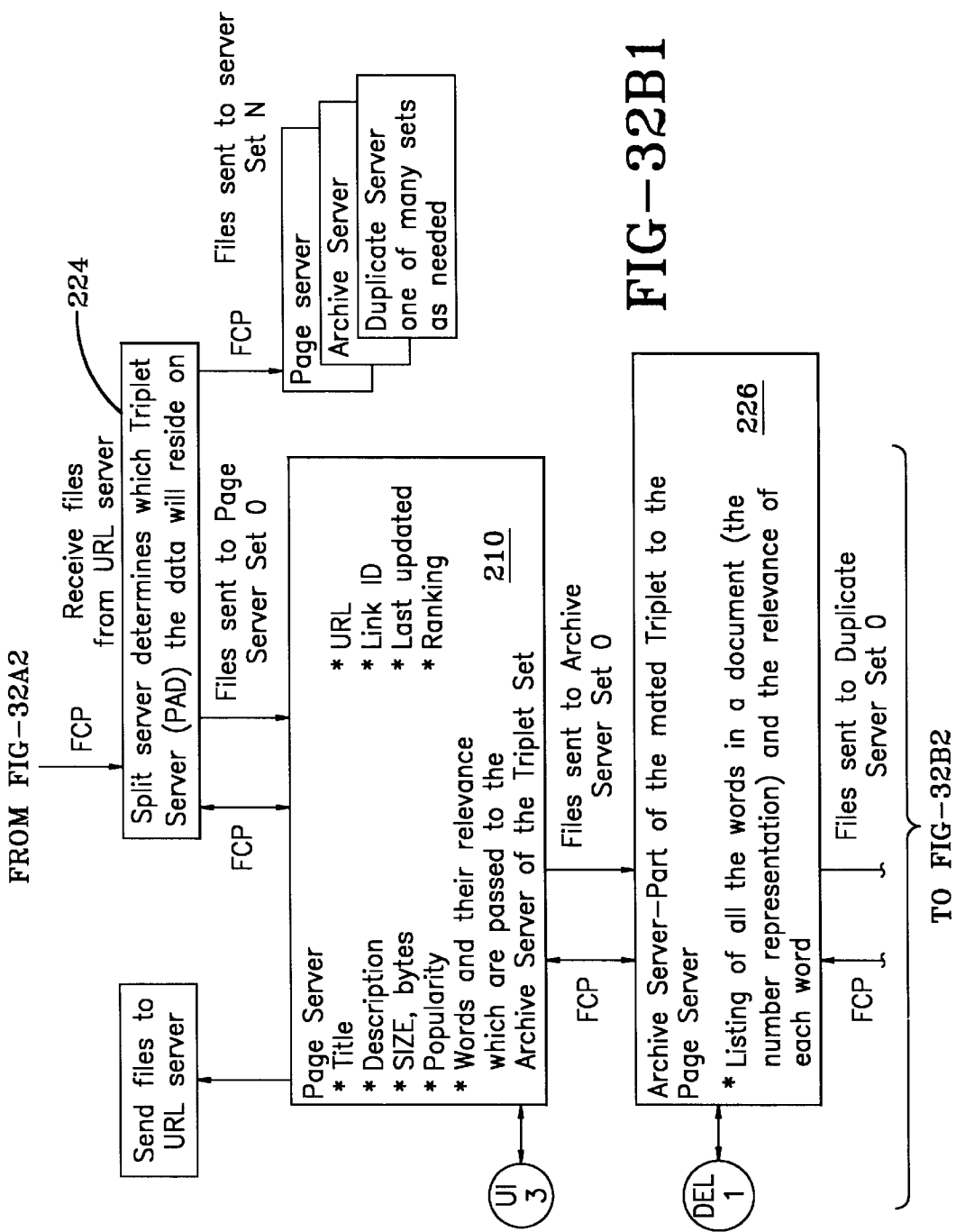

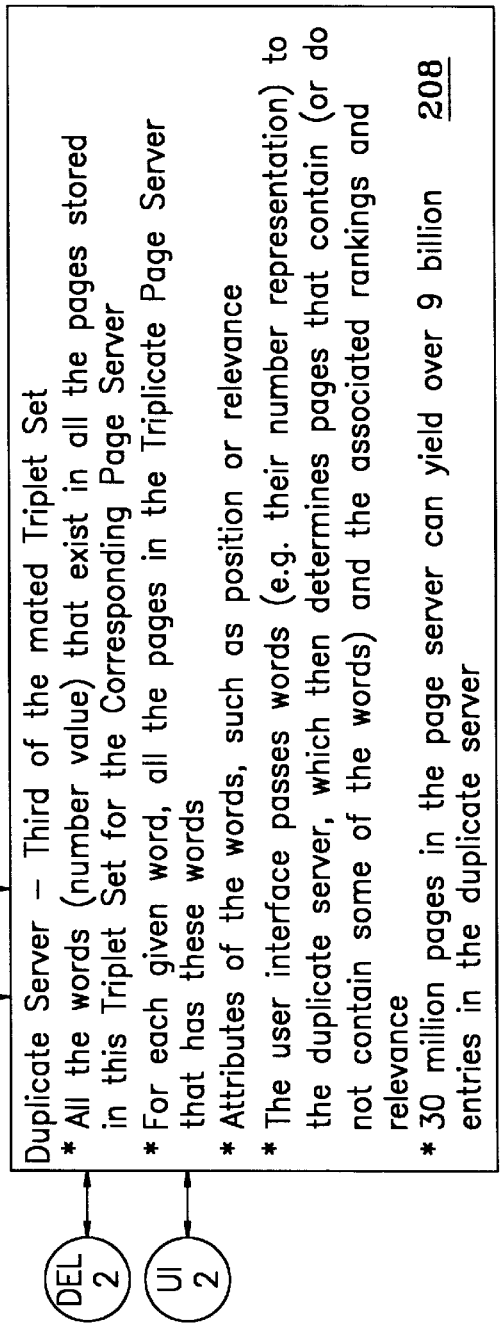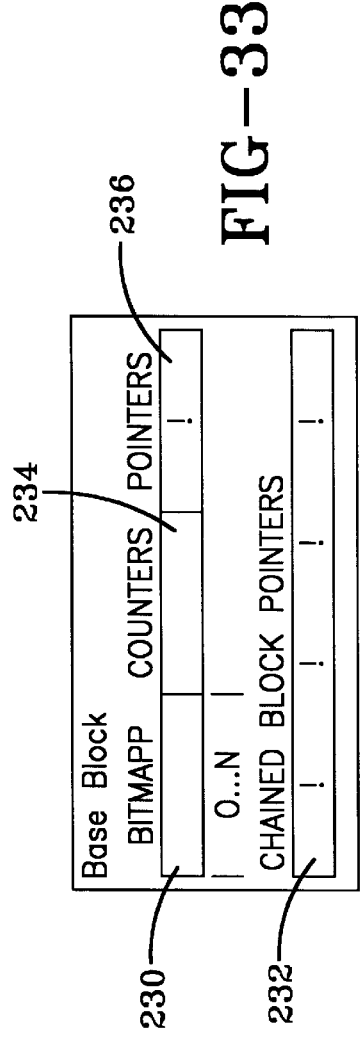

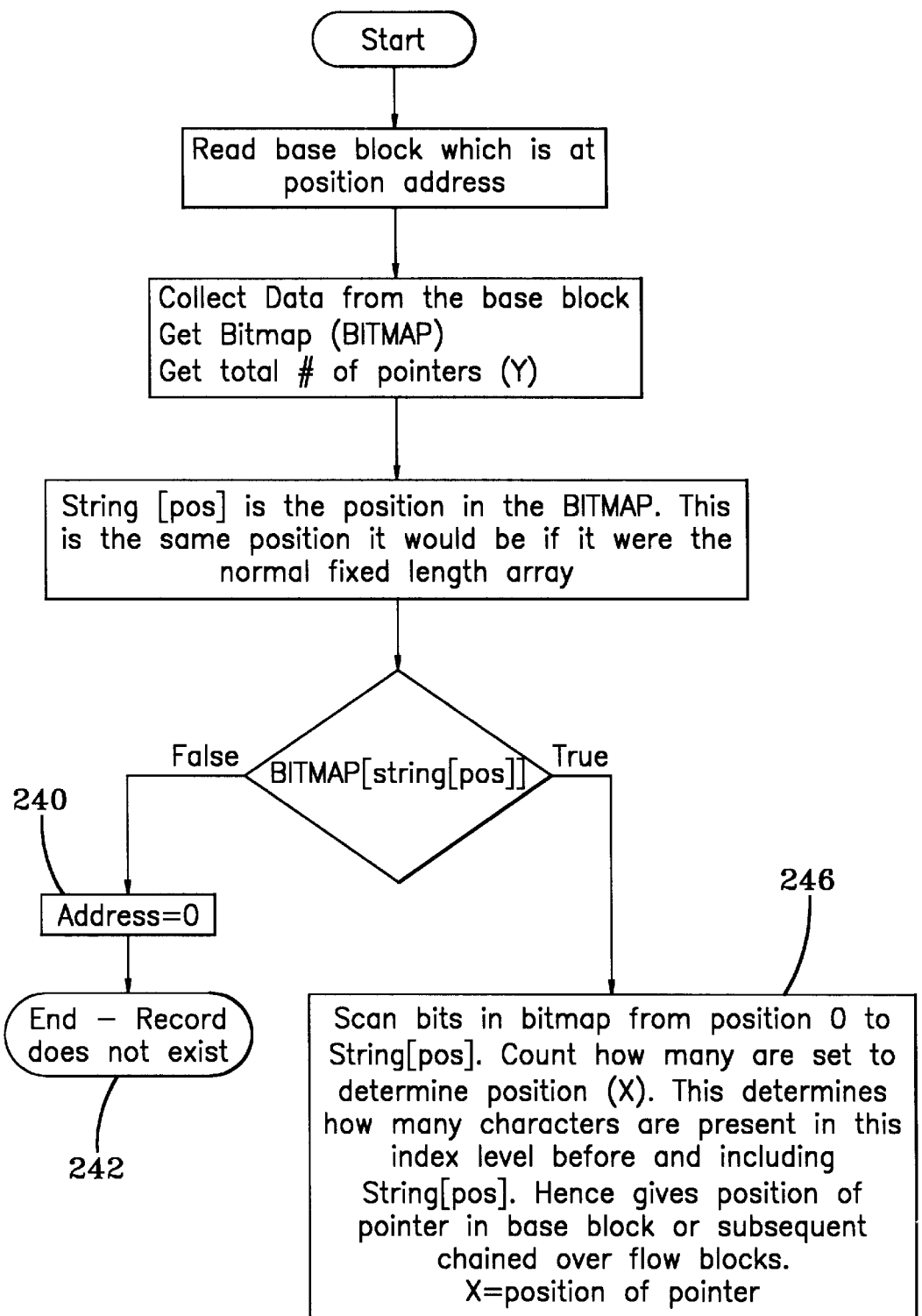
FIG-34A1

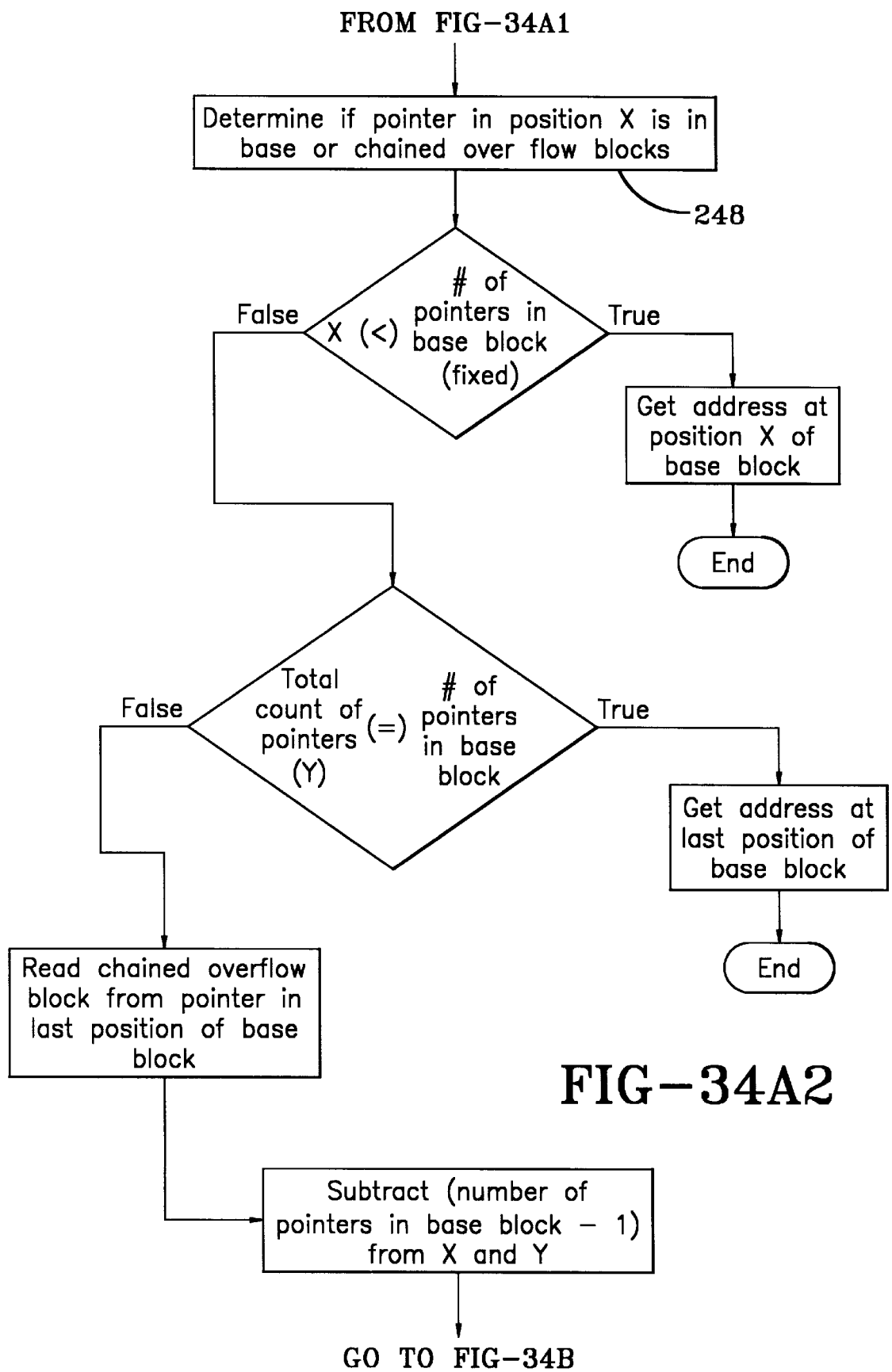
FIG-34A2

Index word "cab" where the compressed base index array is made up of locations (the base index array will normally be big enough to index a–z, 1–9).

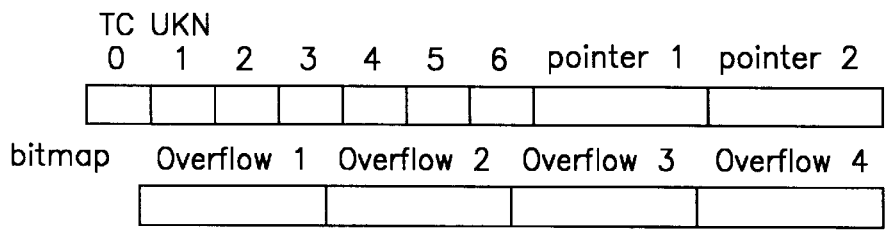

First the word "cab" is put through a mask below.

TC → 0
UKN → 1
"a" → 2
"b" → 3
"c" → 4
"d" → 5
"e" → 6 so the word "cab" will have a converted string of "4,2,3,0".

Now to the index the string "4,2,3,0" according to the compressed index structure of the present invention would look as follows:

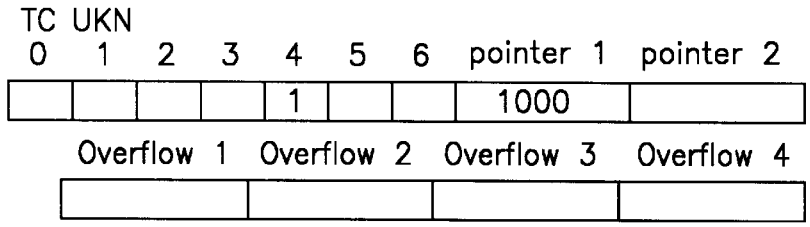

LEVEL 1 INDEX ARRAY (input "c", put a 1 into location "4" corresponding to "c", add pointer to address 1000 in pointer 1 location which points to second level index array.) since this is the 1st bit set in this block.

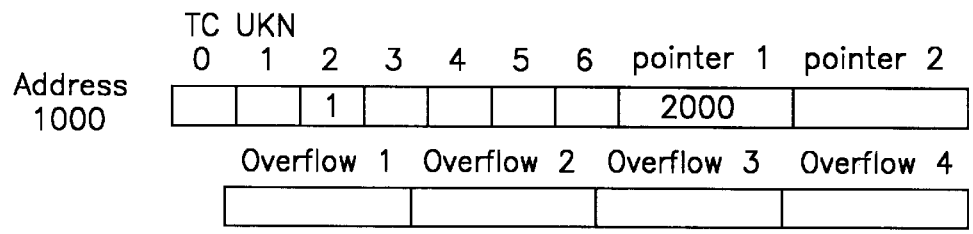

LEVEL 2 INDEX ARRAY (input "a", put a 1 into location "2" corresponding to "a", add pointer to address 2000 in pointer 1 location which points to third level index array.)

FIG-35A

|  | TC | UKN | | | | | | pointer 1 | pointer 2 |
|---|---|---|---|---|---|---|---|---|---|
|  | 0 | 1 | 2 | 3 | 4 | 5 | 6 | | |
| Address 2000 | | | | 1 | | | | 3000 | |

| Overflow 1 | Overflow 2 | Overflow 3 | Overflow 4 |
|---|---|---|---|
| | | | |

LEVEL 3 INDEX ARRAY (input "b", put a 1 into location "3" corresponding to "b", add pointer to address 3000 in pointer 1 location which points to fourth level index array.)

|  | TC | UKN | | | | | | pointer 1 | pointer 2 |
|---|---|---|---|---|---|---|---|---|---|
|  | 0 | 1 | 2 | 3 | 4 | 5 | 6 | | |
| Address 3000 | 1 | | | | | | | 24 | |

| Overflow 1 | Overflow 2 | Overflow 3 | Overflow 4 |
|---|---|---|---|
| | | | |

LEVEL 4 INDEX ARRAY (input "1" into "TC", put a unique numerical value, e.g., "24" into pointer 1 location. The numerical number is used to reference all documents containing the word "cab".) A actual record location may be placed in pointer 1 location.

If the word "cab@" is to be indexed, the converted string would be "4,2,3,1,0" (where "1" is for the unknown character "@").

Accordingly, the fourth level index of this example would have a "1" in location "UKN" and a pointer to the 5th level index would be stored in the pointer 1 location of the Level 4 index.

For the example above, the overflow pointer locations were not used.

FIG-35B

SEARCH ENGINE USING INDEXING METHOD FOR STORING AND RETRIEVING DATA

This application is a continuation-in-part application claiming the benefit of U.S. application Ser. No. 08/937,990 filed on Sep. 26, 1997, abandoned, which claims the benefit and a continuation of U.S. application Ser. No. 08/904,405 filed on Jul. 31, 1997, abandoned, which claims the benefit of U.S. Provisional Application No. 60/041,403 filed Mar. 19, 1997.

BACKGROUND AND SUMMARY OF THE INVENTION

The present invention relates to the field of storing and retrieving computerized data through the use of a Search Engine and, more particularly, to the indexing of data in system(s) as it relates to Internet, the World Wide Web, an intranet of local systems and/or any combination thereof. Computers are widely used to store and retrieve information. If the number of stored records is of any significant size, the records are typically stored in a computer database. Given a collection of multiple systems, a Search Engine may be used to locate, find, compare, and track data as it relates to documents (including files, images, objects, programs and other data in various forms referred herein as a document) in the System(s). The Search Engine can read the documents through program(s) commonly referred to as a Web-walker, Web-crawler, Spider, Browser or Robot, which acts similar to a user and notes the words in a document, the words sequence and the size of the document If changes have occurred from a prior scan of the document, the date of the document, the file name, computer or server containing the document, the directory of the document, whether the document has a URL (universal record locator) pictures, objects (video, sound, etc.), attributes (color, font, etc.) links to other documents, meta-tags and any other attribute (spread sheets, graphs, computer code, programs, addresses of other documents and their associated attributes, etc.) that could be placed in or relate to the document.

Present Search Engines such as Google, Excite, and Alta Vista perform these following common functions:

browsing of the documents by a program or system of programs to scan the documents for content and attributes;

parsing of the documents to separate out words, information and attributes;

indexing some or all of the words, information and attributes of the documents into a database;

querying the index and database through a user interface (for live users and/or programs and systems) through local and remote access;

maintaining the information, words and attributes in an index and database through data movement and management programs, as well as re-scanning the systems for documents, looking for changed documents, deleted documents, added documents, moved documents and new systems, files, information, connections to other systems and any other data and information.

Google represents a typical Search Engine. The Internet currently contains over one hundred million documents— each on average containing over 100 unique words with an average of over one unique word per document (the URL is usually also unique). This results in an extremely large database of words (over 100 million) and over 10 billion entries in a database that tracks words in referenced documents. As the Internet grows to more than a billion documents, these databases will grow respectively. In typical Internet Search Engine designs, Hash techniques, B-tree Indexes, sorted lists, and variations thereon are the accepted approaches.

The B-tree approach is one approach to an index and a database. Due to the enormous size of the database, and given changes and growth, the present invention utilizes a new approach for structuring databases for Search Engines. The Search Engine of the present invention uses an indexing method that provides advantages to organizing the tremendous amount of information on the Internet and for searching such information in a fast and efficient process. As discussed in more detail in the following detailed description, the Search Engine of the present invention using the described indexing method provides significant practical advantages over known Search Engines.

For example, the present invention significantly increases the speed with which database records can be stored and retrieved. The present invention increases data retrieval as a function of unique and efficient programming steps rather than through hardware configuration.

In recent years the term database has been used rather loosely, and as a result, has lost some of its usefulness. To some a database is just a collection of data items. Others define the term more strictly. However, for the purposes of the present invention, a database is a self-describing collection of integrated records. A database is self-describing in that it contains a description of its own structure. This is called meta-data. The database is integrated in that it includes the relationships among data items as well as the data items themselves. Accordingly, the term database as used in the present application is not limited to merely bits of stored data or information.

A database is made up of both data and meta-data. Meta-data is data about the structure of the data in a database. This meta-data is stored in a part of the database called the data dictionary, which describes the tables, columns, indexes, constraints, and other items that make up the database.

Databases come in all sizes, from a simple collection of a few records to millions of records. A personal database is designed for use by a single person on a single computer. It tends to be rather simple in structure and small in size. A database is a structure that holds data. The database is structured to operate on the data contained within it.

There are many database management systems (DBMS) on the market today. Some run only on mainframe computers, some only on minicomputers, and some only on personal computers and some on most systems. However, there is a strong trend for such products to work on multiple platforms or on networks that contain all three classes of machines. A database that will run on different operating systems such as OS/2, Windows 3.1, Windows 95, or UNIX are said to be portable. Databases are also scalable if they can make use of adding/removing computers for more or less processing speed or power.

Regardless of the size of the computer that hosts the database, and regardless of whether it is connected to a network, the flow of information between the database and the user is the same. The DBMS mask the physical details of the storage so that the application only has to know about the logical characteristics of the data, not how it is stored.

Database structure makes it possible to interpret seemingly meaningless data. The structure brings to the surface patterns, trends, and tendencies in the data. Unstructured data, like uncombined atoms, has little or no value.

Databases may vary in size and structure. However, they are generally structured as a hierarchical, network, or relational model. The hierarchical database assigns different types of data to different levels of a data structure. The links between the data item on one level and data items on a different level are simple and direct. A major advantage of the hierarchical model is the simplicity of the relationships among data items. However, its rigid structure is a disadvantage.

The opposite of a hierarchical structure is one in which any node has direct access to any other. There is no need to duplicate nodes since they are all universally accessible. The network model is based on this concept.

The relational database model was first formulated by E. F. Codd of IBM in 1970, and started appearing in products about a decade later. Relational databases have attributes that distinguish them from databases built according to other models. In a relational database, the database structure can be changed without requiring changes to applications that were based on the earlier structure. For example, if one or more new columns are added to a database table, older applications that processed the table would not require alteration because the columns they deal with are unaltered.

As discussed, a database is usually more than a collection of tables. Additional structures, on several levels, help maintain the integrity of the data. A database's schema provides an overall organization to the tables. The domain of a table column tells us what values may be stored in the column. You can apply constraints to a database table to prevent invalid data from being stored in it. A view is a way of looking at only part of the database at one time. In relational tables, primary and foreign keys are used to connect tables.

A database is usually used in a client/server environment. The client/server environment is where some client requests information and/or services from some server which provides services back to the client. The client usually consists of some graphical interface such as Microsoft Windows (Microsoft Windows is a registered trademark of Microsoft Corporation). The server usually consists of one or more large computers connected to provide very fast response time to clients. A client/server environment can exist on a single system usually as two or more separate processes running simultaneously. Most databases are servers giving results to requests made by different clients.

Databases make a way of storing information without much work by the applications. Data is stored as data and meta-data in files. The way this is stored is transparent to the application which allows for multiple programs to access the same data using a given database. The database doesn't even have to be on the same machine as the application. Databases can change without affecting the application to some extent.

Records are made up of a collection of fields which usually comprise a group of bytes. A group of bytes is usually called a string. Bytes are used to represent some character set or, as a collection, some number. A string which is a group of characters from some character set will vary in length. Numbers are usually represented by a fixed number of bytes.

Information or data may be stored as a collection of records onto some type of magnetic device for retention while the machine that is supposed to read and/or write the information upon request may be without power, or simply off. These magnetic devices come in several different varieties. The most common among the personal computer world are the floppy disk (or diskette) and the hard drive.

These will be referred to simply as disks hereinafter. Other forms of storage include memory which is dynamic (usually RAM memory) meaning that it must be loaded every time the given machine boots up or is turned on. Operating systems control the way in which data is read from and written to these disks. The way operating systems use RAM memory and disks is a concern of the present invention, but instead of going into great detail of how storage may be implemented, it is assumed that optimal disk and RAM memory usage is available. Groups of data are referred to as files, objects, libraries, etc.

Files are used to store programs which are a series of commands to a computer. Computers execute machine language instructions represented by bytes of the program. A data file is a collection of information usually separated into records that a program will use. Databases are used today to allow a higher level of transparency in which information is to be stored and/or retrieved. Databases consist of a program that works as a message broker between the programs which need data and the data files. This database program can enforce all kinds of security rules, referential integrity, and duplication of records.

As the computer industry continues to boom, the speed of the hardware keeps getting faster. The size of storage available on these machines has also grown at enormous rates. Even with all the speed and storage available on machines today, many databases tend to be very slow. The present invention is intended to increase the speed at which data is accessed and stored.

Computers are math machines. This means that they work very well with numbers. Strings are a series of numbers usually of an indeterminable size. Operations on strings tend to be very slow in comparison to single numbers. Sorting strings is one of the slowest operations a computer can perform. The reason computers are good with numbers and not with strings is because there are no existing machine language instructions to support strings directly. Instead, strings must be converted to a series of numbers and instructions must be executed on each of those numbers. Data files are a series of fixed or variable length records. Inserting records in the middle of these files is an expensive operation because, in doing so, other data must be shifted. The present invention allows the placement of new records at the end of the file.

The present invention comprises a method for storing and retrieving large amounts of data, a system and a network wherein the method can be performed. The density of information stored may become larger than traditional methods of storing and retrieving data, yet the computational power needed therein will become significantly smaller. This system does not require a big system/small system architecture in which the big system stores all of the information in an efficient manner and then the small system is used for retrieval purposes. Although this is the traditional approach, many problems arise from such an architecture. New records added to the database after the big system stores the information will either be inserted in a very long and tedious process or all new records will not be accessible in an efficient manner. The present invention, on the other hand, increases speed of processing data with no real care as to the size of the data.

Records are stored in a container (see FIG. 1) at some location. That location could then be used to identify the record in the container. The location could be a relative address of the record or the actual address of the record. It makes no difference as long as the location can identify the record within the container. The location hereinafter will be referred to as an address, or record location. The way the records are stored in the container also is of no concern with respect to storage and/or retrieval. The records could be sorted, partially sorted, or not sorted at all. If speed is of a primary concern, the best place to store the record within the container is usually at the end. Storing a record in the middle of a container usually means that another record (or, in most cases, a group of records) must be compared and moved.

A container is stored physically on the system as a file or object on a mechanism that will maintain information when the system is off. Magnetic disks utilize a common notation for storing, organizing, and retrieving data into groups, containers, files, or objects. The terms disk and file will be used hereinafter for a mechanism of storing information and the container respectively. Data and records will also be used interchangeably.

One embodiment of the current invention uses three entities (FIG. 2) to store and retrieve records. The container, or file, is used to store and retrieve records. The indices are preferably used to store the addresses, or locations, of the records. Records are usually a collection of fields. These fields comprise a string of characters from a given character set (e.g., numbers). The fields are preferably not stored in the indexes however they are used to shape the index. The index is initially a list or array of empty or NULL index locations. These index locations are used to store addresses of record locations or pointers to other indexes. This list initially includes an empty location for all important characters (that is, characters to be indexed), a location for other unknown characters (UKN), and a location for a terminating character. FIG. 2 describes an index for numbers, indexing characters '0' through '9'.

A duplicate segment stores multiple occurrences of a given string from a given field. It may be a wide linked-list structure containing a count of occurrences and several addresses per segment. The number of addresses per segment may vary. A pointer to the end of the list could also be included in the first duplicate segment. Additional fields may be added as found necessary (e.g., a flags character to show if a duplicate segment is sorted).

After a record is placed into the record file and an address is returned, the record is then broken up into fields which can be used to represent strings of characters. These strings of characters should be terminated with some terminating character. For example purposes, the terminating character may be the normal C programming language style terminating character '0' (zero). Strings of characters can then be broken into their individual counterparts to shape the index (as will be shown in the detailed description of the invention). The first character is used as a reference to the first index. In one embodiment of the present invention, the address retrieved from a location in the index is checked for one of three possibilities. The address can be empty, or it may contain an address to a record, or be an address to another index. The type of the value can be specified within the address by way of signed integers (e.g., a positive integer signifies a FULL state, a zero signifies an EMPTY state, and a negative number signifies an ADDRESS TO INDEX state). Other combinations are possible, but these are the values that are used hereinafter.

The indexing schema of the present invention may also be combined with other known database technologies (e.g. B-tree, Hash, Direct Access, Sorted Set, Unsorted Set, etc.) to work as a "hybrid" database indexing system. This may be accomplished by having the index locations of the present invention point to any of the other known database technologies at predetermined levels of the index structure. Alternatively, the other known database structures, at predetermined levels of their structure, may point to the indexing structure of the present invention, or any combination thereof. For example, the indexing schema of the present invention may be used to index the first five characters of all words in a database while resorting to other known database technologies to index the remaining characters of the words, if any. Accordingly, the indexing schema of the present invention, by indexing the first 5 characters, narrows the set (or the amount of further indexing needed) for the other existing technology. This hybrid indexing system is advantageous in that it combines the high speed indexing and retrieval of the present invention with the other known technologies which do not require as much memory for storing indexes.

In one embodiment of the present invention specific to an Internet Search Engine, the indexing process is comprised of the steps of:

retrieving a Web page from the Internet, including a URL associated with the retrieved Web page;

indexing data items from the Web page according to the present invention, the indexing further comprised of the steps of:

a. creating an index structure by creating a plurality of index arrays, each of the index arrays having locations relating to a predetermined list of characters, wherein the locations of the plurality of index arrays are adapted to store either a pointer to another index array or a second data element;

b. associating a unique reference for each unique data item in the index structure;

associating each of the unique references to Web pages containing the unique data items associated with the unique reference. Wherein the unique reference may be a unique numerical value assigned to each unique word, and wherein that word is used to look-up all URLs of web pages containing the unique word.

Furthermore, the Search Engine according to the present invention may be configured with a "compressed" index array structure for the purpose of saving memory space. "Compressed" as the term is used in the present invention means that the index array structures are smaller in length than the "uncompressed" index array structures. The "compressed" index arrays are condensed by:

a.) providing locations in the index array which may be as small as 1 bit in length; and b.) merely storing an "on" or "off" (i.e., "full" or "empty") indicator in the location;

c.) counter locations and pointer locations of predetermined length are also preferably added to the "compressed" index array structure for counting the number of locations that are full and pointing to the locations of the next level index arrays.

The "compressed" index array structure saves a significant amount of memory space as there are less bits (e.g., 1 bit) for each location assigned to a character as opposed to 8 or more bits.

The present invention significantly increases the speed with which database records can be stored and retrieved. It accomplishes this, not through an improvement to computer hardware, but through efficient programming which utilizes the commands the computer can execute the fastest. The need to sort records and/or indexes for rapid retrieval may be eliminated. In fact, records do not need to be stored in any order for retrieval. They also do not have to be grouped as traditionally known. Searching is independent of records and can be compressed and/or put into variable length formats. This in turn allows for the computer database to grow to a size only restricted by what the computer hardware can handle, without much of a degrade in performance.

In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which:

FIG. 6B illustrates a graphical depiction of an array used to store converted strings;

FIG. 6C illustrates a graphical depiction of one embodiment of an index array;

FIG. 13 illustrates examples of masks of the present invention;

FIG. 18 illustrates another example of the present invention;

FIG. 22 illustrates another example of the present invention;

FIG. 23 illustrates another example of the present invention;

FIG. 24 illustrates another example of the present invention;

FIG. 25 illustrates another example of the present invention;

FIG. 26 illustrates another example of the present invention;

FIG. 27 illustrates another example of the present invention;

FIG. 28 illustrates another example of the present invention;

FIGS. 32A and 32B illustrates an example of a flow diagram of some of the processes and servers within a search engine and two uses of the present invention;

FIG. 33 represents another embodiment of an index array of the present invention;

FIGS. 34A and 34B represent an example flow chart of an indexing process according to the present invention; and FIGS. 35A and 35B represent one example index structure according to the present invention.

DETAIL DESCRIPTION OF PREFERRED EMBODIMENT(S)

The preferred system herein described is not intended to be exhaustive or to limit the invention to the precise embodiments disclosed. The preferred system is described to explain the principles of the invention and its application to practical uses so that others skilled in the art may practice the invention.

Figure 1:
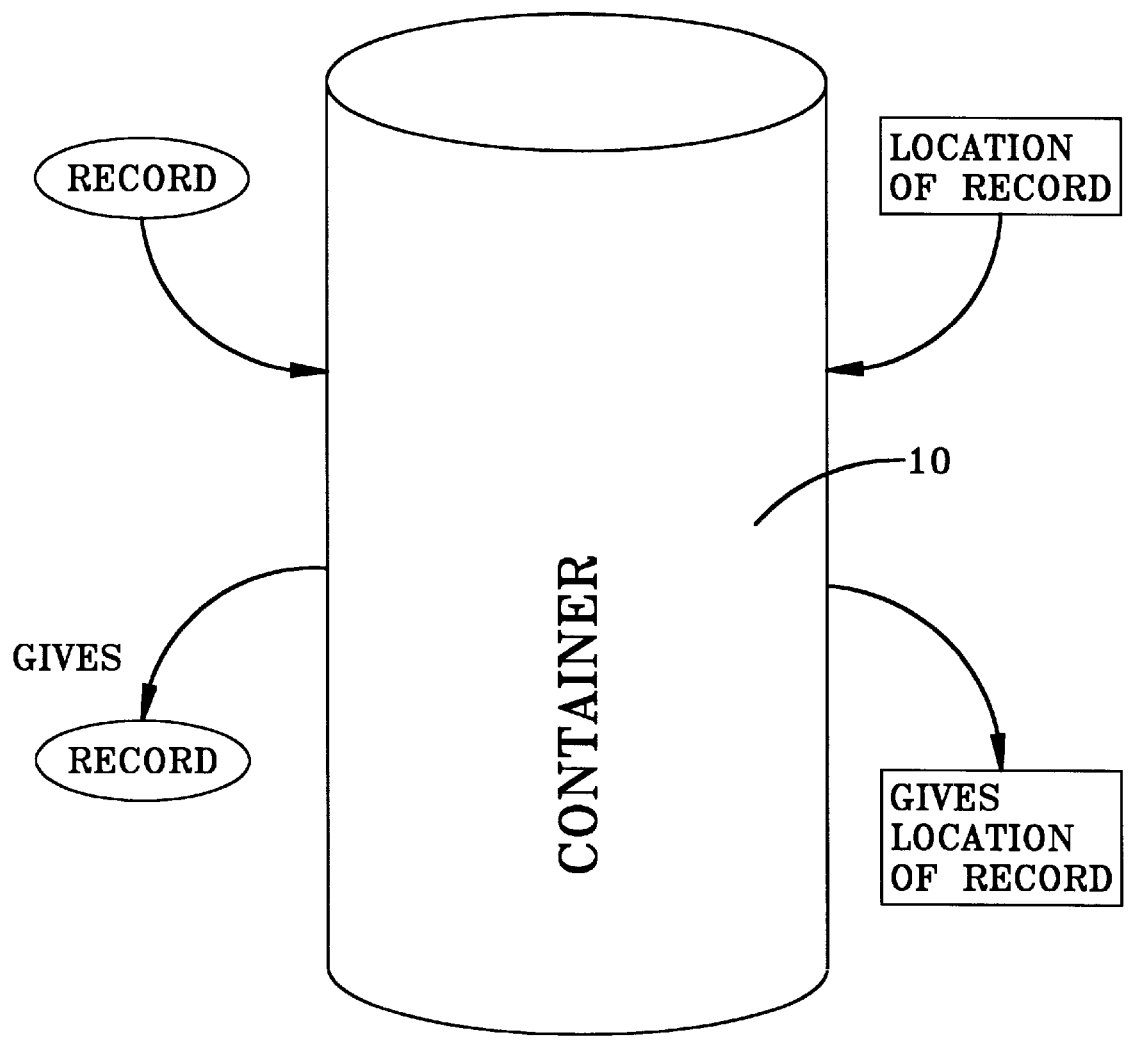
FIG. 1 illustrates a depiction of the basic steps of recording and storing a record according to the present invention.
Figure 2:
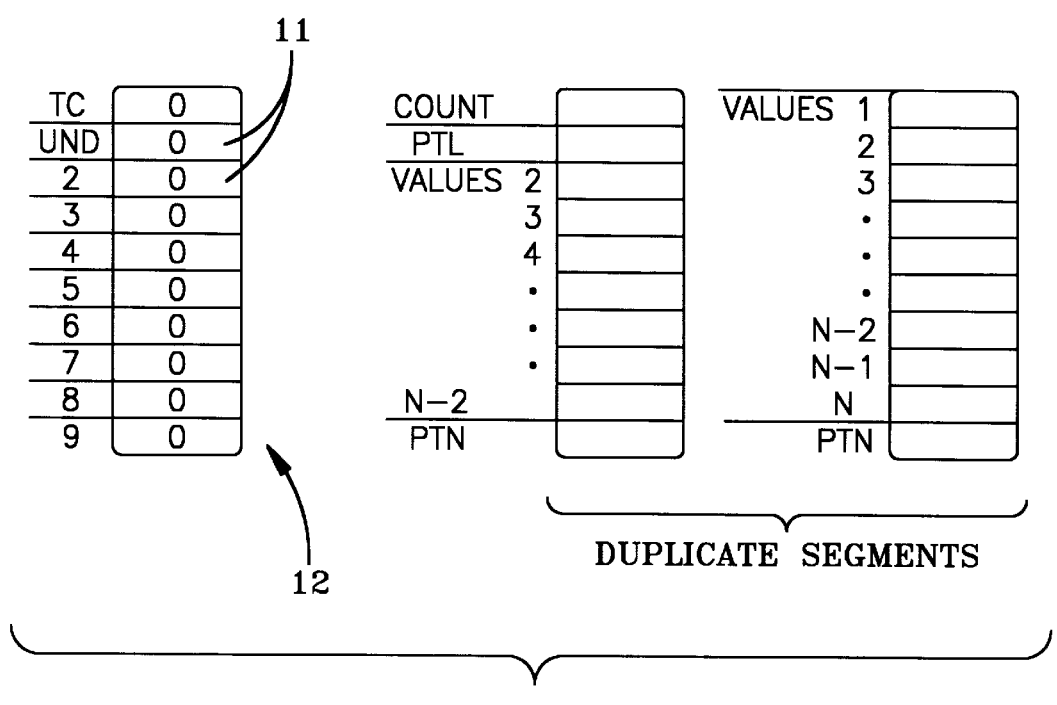
FIG. 2 illustrates the basic components of the present invention.

FIG. 1 illustrates the basic process steps of a typical record being inserted into a data container 10 or file. Records are stored somewhere in a container. The absolute or logical address of that record is then stored in an index 12 (see FIG. 2.) FIG. 2 illustrates the basic components of the system of the present invention. Each data object located in a field, or part of the record, along with the address is then used to shape the index 12. The index 12 or array preferably consists of a series of fixed length locations. FIG. 2 illustrates an "uncompressed" version of the index array 12. Another embodiment describing a "compressed" index structure will be described in more detail in the following description. The actual data object is preferably used to create a logical field consisting of a string of characters numbered 'A . . . N' with a TERMINATING CHARACTER appended at the end. (This conversion is preferably performed by the masks of the present invention, see FIG. 13). The cardinality of the character at position 'A' of the string is then used to reference the first index segment 12 using that value as a logical position.

Each index location 11 of the index 12 contains index elements. The element located at the logical position in the index 12 is checked for one of three conditions. An element indicates that an index location is either EMPTY, FULL, or contains another absolute or logical address to another index segment 12. If the pointer is EMPTY the address of the indexed record (i.e. the record location) replaces the EMPTY designator and the index location becomes FULL.

If the index location is FULL, this signals that a field of a record having a same first character has already been stored. Accordingly, if the index location is FULL, the record location is saved and a new index is created. The logical or absolute address of the new index replaces the record location that was previously stored in the FULL index location. The record is retrieved from the container 10 using the saved pointer. The cardinality of the character at position 'A+1' of the converted string is then preferably used to reference the new index segment using that value as a logical position. The cardinality of the character at position 'A+1' of the string of the original record is then also used to reference the new index. If the cardinality of two indexed strings at position 'A+1' are equal, then a new index segment must be created as described above and the value at position 'A+2' should be used to shape the index. This process may continue until a TERMINATING CHARACTER or a given length to be indexed is reached. Once either happens a segment used for duplicates is preferably created. The preferred method for the duplicate is a wide singly linked list with a reference to the last node, or segment, within the first node, or segment.

If the index contains an address, or pointer, to another index, the index pointed to is then used in conjunction with the next character's value in the string. The pointer referenced in the string is then used again as described above until an EMPTY index location is found, a TERMINATING CHARACTER reached, or the given length for the index to index has been reached.

Searching for records is done in a fashion very similar to inserting new records. The field to be searched for is formatted into a logical field with the format of a string containing 'A . . . N' characters with a TERMINATING CHARACTER appended to the end. The cardinality of the character at position 'A' of the string is then used to reference the first index segment using that value as a logical position. If the pointer referenced is EMPTY, no records are returned. If the pointer referenced is FULL, then one record is returned from the container that has the actual or logical address contained in the pointer. If the pointer referenced contains a pointer to another index segment, the new index segment is then used in conjunction with the next character in the field. This process is repeated until the TERMINATING CHARACTER or a given length to be indexed is reached, a value of FULL, or a value of EMPTY is found. If the TERMINATING CHARACTER or a given length to be indexed is reached, then all the pointers contained in the duplicate segment are returned.

Searching records in the container 10 may become the sole responsibility of the index segments 12. This means that the record may be of a variable length or a fixed length. Variable length records can save a significant amount of space since they help to eliminate internal storage leaks created by fixed length records. If records are appended, the end of the container 10 and/or their address becomes greater than addresses previously stored in the duplicate segments. Since the address becomes greater, the new addresses can be appended to the end of duplicate segments and the duplicate segment may be sorted by address. The combination of two or more sorted lists of numbers using a boolean operation such as AND, OR, XOR, or NOT can be accomplished in O(n) or constant time. The retrieval of the records will be faster since the records can be retrieved in a random/sequential manner (one pass). If the records in the container 10 are initially sorted, all retrievals will be sorted as long as new records are not appended.

The present invention preferably uses a new index schema which consists of a file for records 10, a file for indexes of each field within the records, and a file for each index file. The record file is made up of records each located at some logical position within the file. This position is the preferred way to identify a given record within the index. If a position is given to the record file, a record will be returned. The process for storing and/or retrieving data as described herein can be used for many purposes other than databases. For example, the present invention may be used with compilers, artificial intelligence, a list of words, any set of information to be indexed for retrieval (that does not have to be part of a database).

Figure 3:
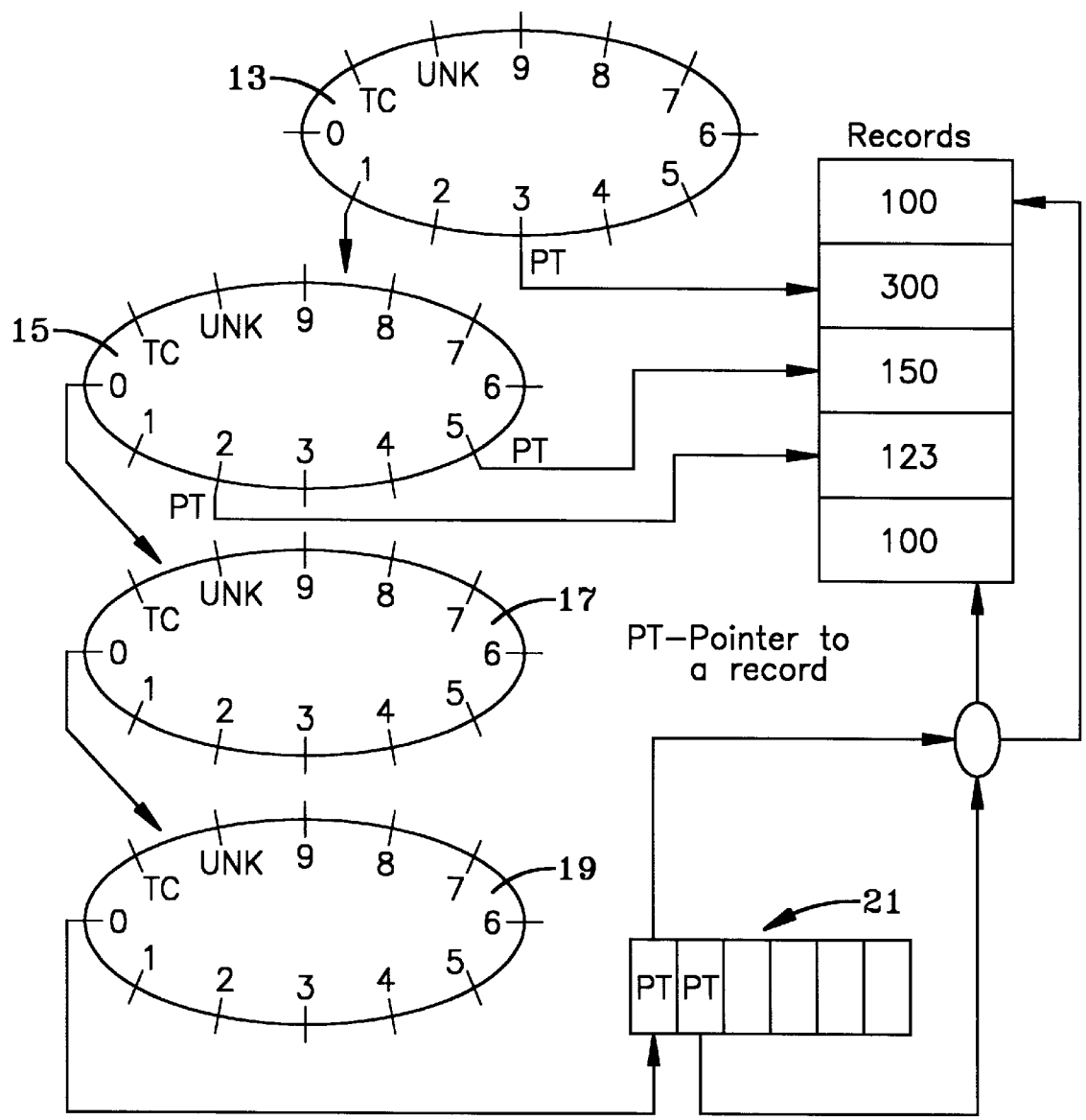
FIG. 3 illustrates one illustration of the indexing system of the present invention.
Figure 4:
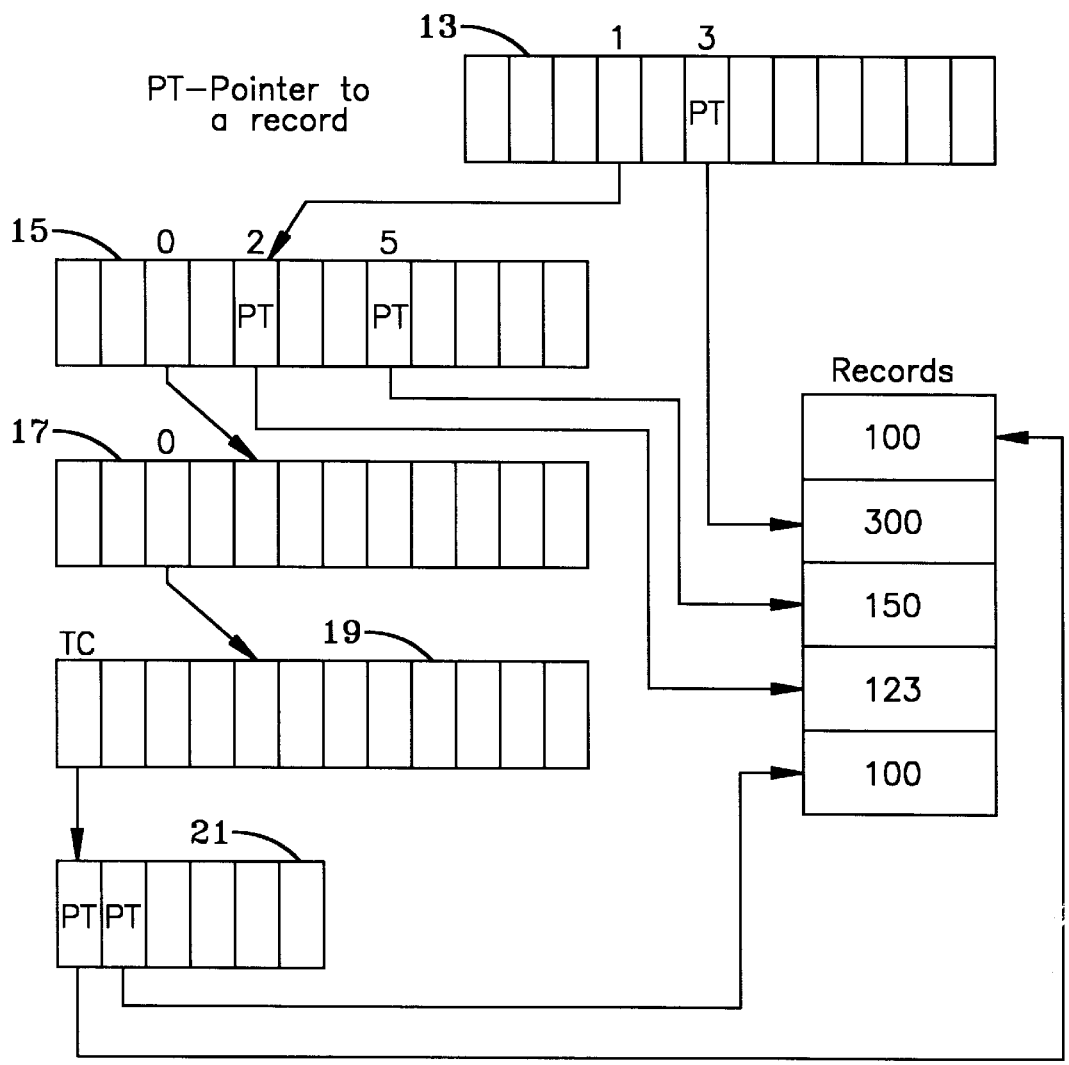
FIG. 4 illustrates another illustration of the indexing system of the present invention.

FIGS. 3 and 4 provide basic illustrations that depict a graphical view of one embodiment of the indexing system of the present invention. FIG. 3 illustrates how the indexing system would break out for the storing and indexing of a container containing "100", "300", "150", "123", and "100", where each of the data records are indexed sequentially from left to right. As illustrated, in this embodiment the indexes have 11 index locations; one location for each single digit (i.e. 0–9), one index location for a terminating character "TC" (i.e. indicates end of a data record), and an index location for all other unknown characters "UNK".

By following the elements stored in the index locations, it is possible to determine what is stored in the record and where the data record is located. For example, looking at the index structure of FIG. 3, it is clear that there are two data records of "100" stored in the record. The first index segment (i.e. the top level index segment 13) is the first link of the index structure. Looking at index location "1", which in this example corresponds to a character "1", index location "1" contains a pointer to a second level index location 15. Position "0" of the second level index segment 15 points to a third level index segment 17, and position "0" of the third level index segment 17 points to a fourth level index segment 19. The fourth level index segment 19 has a pointer to a duplicate segment 21 stored in the "TC" index location. The addresses stored in the duplicate segment 21 point to the record locations of the "100" data records (as illustrated, the duplicate segment 21 points to two record locations, so there are two records of "100" stored in the record). Similarly, looking at the top level index segment 13, it is clear that there is only one data record that starts with a "3", and that it is stored to the second location of the record, as pointed to by the "3" index location.

FIG. 4 illustrates another view of the indexing structure of FIG. 3. Accordingly, the data stored in the records will dictate how the indexing structure for that particular record will be structured.

Records are inserted into the index for retrieval as follows. The record is entered from some entity into a record file. For example, data may be downloaded from other computers, data may be inserted by data entry personnel, and data may exist in the same or alternative formats.

Figure 5A:
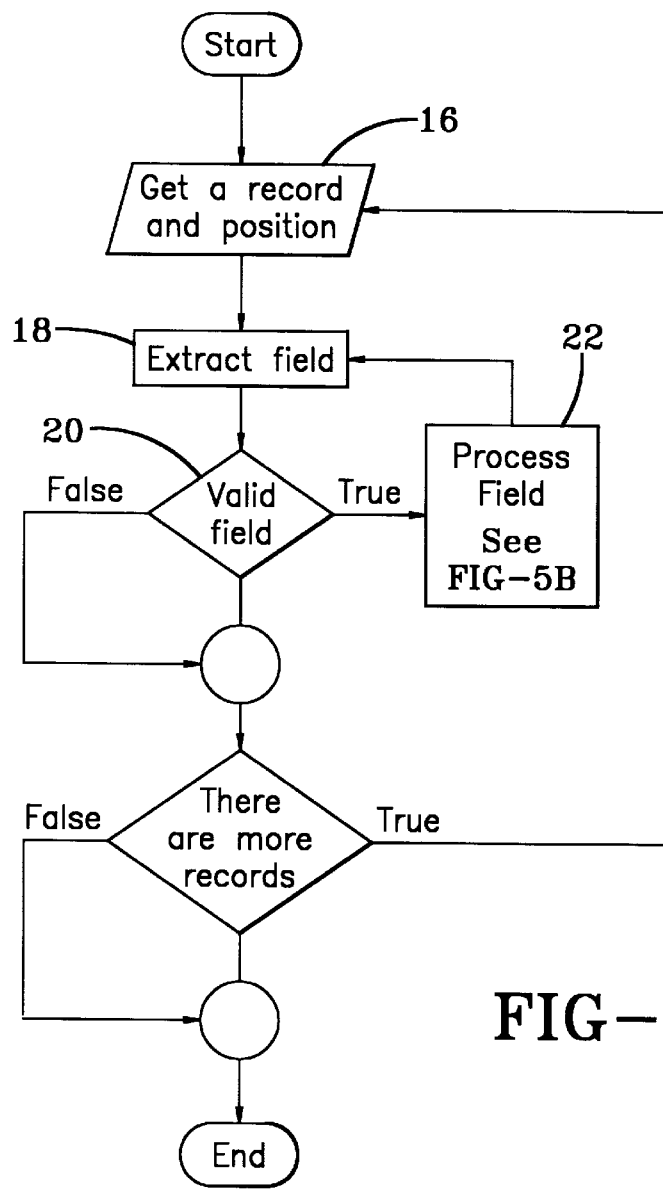
FIG. 5A illustrates an example of a flow diagram of the process of inserting records according to the present invention.
Figure 5B:
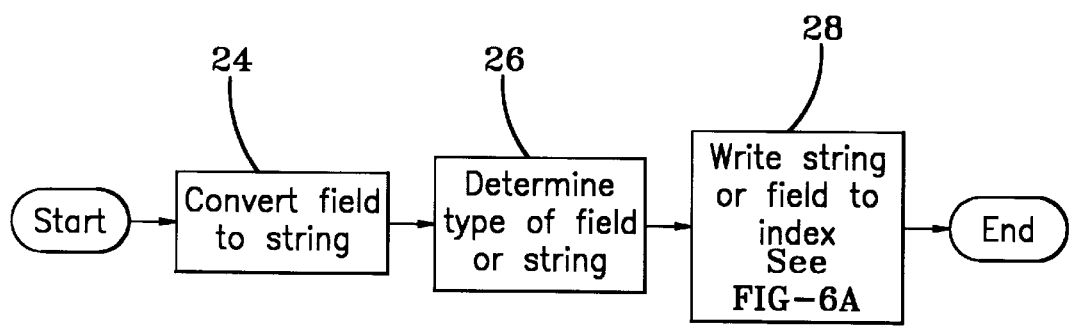
FIG. 5B illustrates an example of a flow diagram of the process of converting a field to a string according to the present invention.

That record along with its position are used to shape the indexes 12 ( FIG. 5A—step 16). The indexes 12 preferably consist of a series of locations for important characters to searches, a terminating character, and a location for characters that are not important to searches (see the index 12 in FIG. 2). The data in a field is extracted from the record and then processed (FIG. 5A—steps 18, 20, 22). Additional records may be added in the same manner. The data in each field is then preferably converted into a string which is terminated with the terminating character. The data is preferably converted by passing the data through a mask. (FIG. 13) and the new value obtained is then indexed (FIG. 5B—steps 24, 26, 28). For example, FIG. 13 illustrates an alphabetic mask and a numeric mask. (The data object "100" converted via the numeric mask of FIG. 13 would equal "3,2,2,0" where "0" indicates the terminating character.)

Strings may be indexed to a given length (Max_Length, FIG. 6A—steps 30, 32) to save some storage. If the string's length (String_Length, FIG. 6A—steps 30, 34) is greater than the maximum allowable length to be indexed, then only the characters 0 . . Max_Length can be used to index. Otherwise all characters of the string may be used to index. The flowcharts of the specification assume the maximum length to be one less than actually anticipated and it is preferred that the string's length not include the terminating character.

Figure 6A:
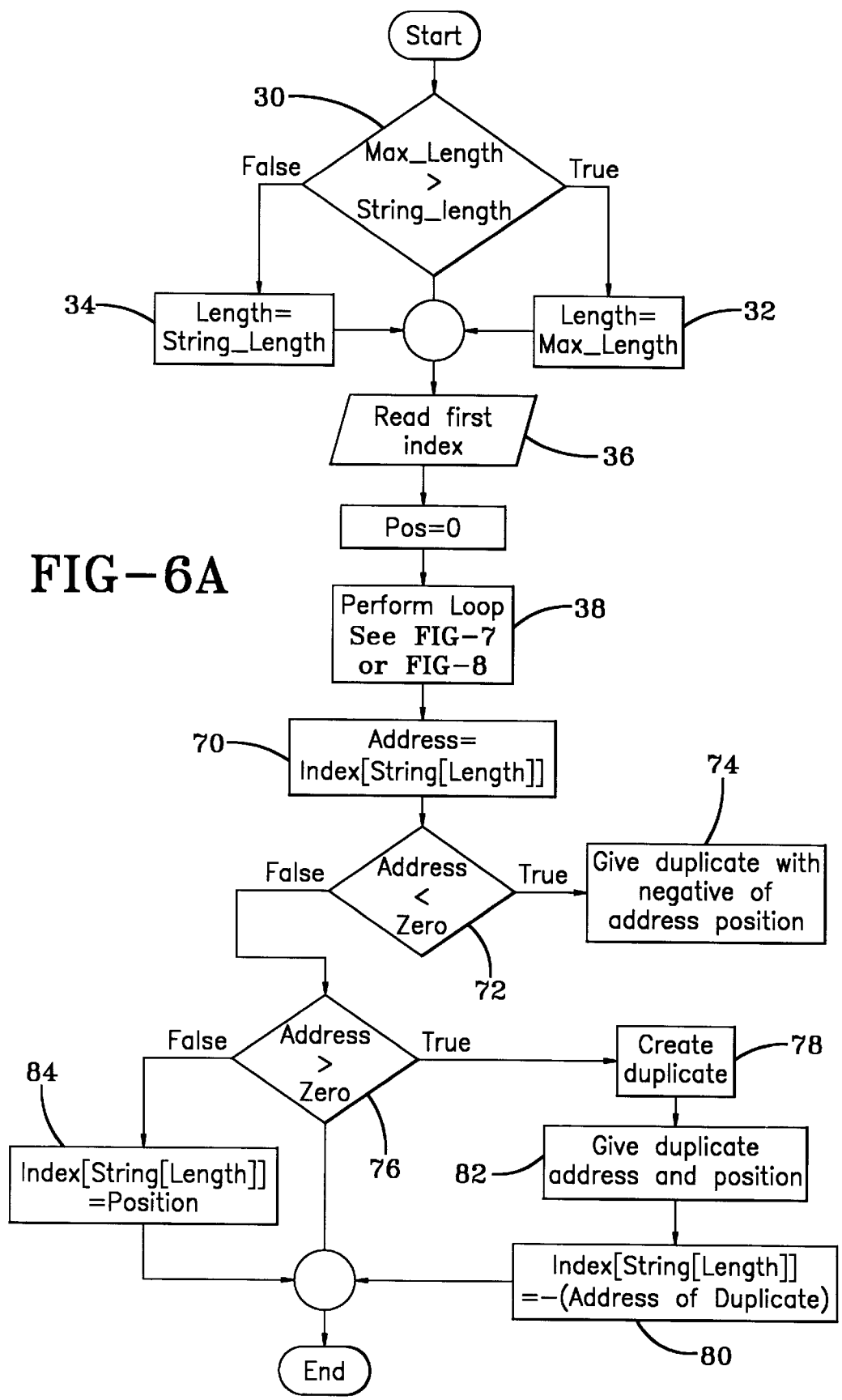
FIG. 6A illustrates an example of a flow diagram of writing a string to an index according to the present invention.

A temporary length (Length, FIG. 6A—steps 32, 34) and position within string (Pos, FIG. 6A—step 36) is set up to cycle through each character to be indexed within the given string (FIG. 6A—step 38). The loop may be performed in a variety of ways. The first way will index enough characters to differentiate between any other string indexed. The second will index either the entire string or at least the maximum allowable amount of characters to be indexed. Also note that the current index is preferably the first index for that field.

For the purpose of the description embodied in the flowcharts for one embodiment of the invention, where:

Address=Index[String[Pos] ]

"Address" is the named variable for the value retrieved from an index location of the array "Index".

"String" is an array containing the converted string characters. For example in the example, the field value, i.e. data object, of "100" was converted to a string of "3,2,2,0" using the numeric mask of FIG. 13. The value of the converted string characters representing positions in the "Index" array.

Accordingly, when writing a field value of "100", it is first converted into "3,2,20". This converted string is then inserted into an array (i.e. "STRING[]"). See FIG. 6B. Then the program looks to the first character of the string (preferably starting from the left) to index. Accordingly, "Pos" is set initially to 0. Pos=0 representing the leftmost character of the string. Accordingly, in this example, String [0] relates to a converted string value of "3".

Accordingly:

Address=Index[String [0]]; where String[0]="3"
Address=Index[3].

The "Index" array is preferably an array that stores the index elements, including the addresses (or positions) of the indexed strings.

Accordingly, Index[3] as illustrated in FIG. 6C is empty as Index[3]=0. (If the value was negative it would mean that another index segment is present, and that the second character of the string must be indexed, or if the value was positive, then it means the first index is full and another index must be created.)

Since location 3 of the Index array (i.e. Index[3]) is empty, the record location of Record "100" may be placed in that slot. Accordingly, Index[3] is set to "Position" which is the address, or record location, of the Record "100".

Figure 7:
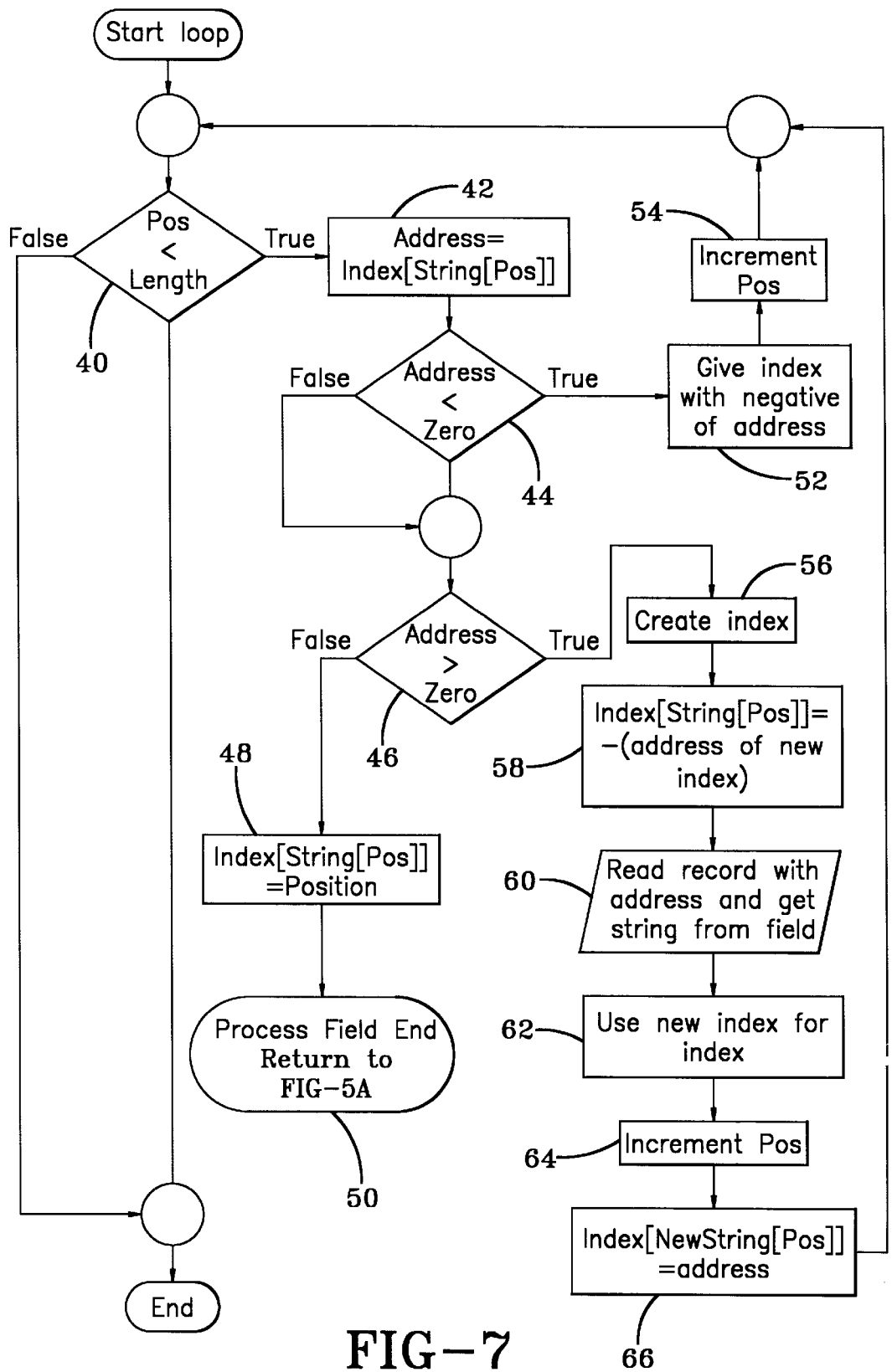
FIG. 7 illustrates an example of a perform loop for writing a string to an index according to the present invention.

While Pos<Length (FIG. 7—step 40) is true, the data (or "Address") located in the String[Pos] of the current index is taken (FIG. 7—step 42). It is then tested to be less than, greater than, or equal to zero (FIG. 7—steps 44, 46). If "Address" is equal to zero, signifying an EMPTY condition, (FIG. 7—steps 40, 42, 44, 46, 48, 50), the data contained in the index is replaced by the position of the record, e.g. address, within the record file (designated by "Position"). In this case the insertion is now complete and should be terminated.

If the "Address" is less than zero, this means that a data object with the same first character has already been stored and indexed. Additionally, if the "Address" is less than zero, an index with the negative of the address replaces the current index and Pos is preferably incremented by one (FIG. 7—steps 40, 42, 44, 52, 54). (In another embodiment, the Pos variable may be incremented by more than one or even decremented depending upon how the data objects are indexed.) By incrementing the Pos variable by one, the next character in the string is indexed. By incrementing the Pos variable by one, the process then continues with the next character within the string until the insertion is either complete or Pos no longer is less than Length.

If the data in the index, or "Address", is greater than zero (e.g., meaning that the index location is full with a pointer to a record location), a new index is preferably created with the negative address of the new index segment replacing the record address previously contained in the index (FIG. 7—steps 56, 58). The new index will now become the current index. The record at the address is retrieved from the record file. The string created from the current field of the new record is used in conjunction with the character at position Pos+1 to fill the new index. Accordingly, Pos should be incremented by one (FIG. 7—steps 60, 62, 64, 66). Again the process continues with the next character within the string until the insertion is complete or Pos no longer is less than Length.

Figure 8:
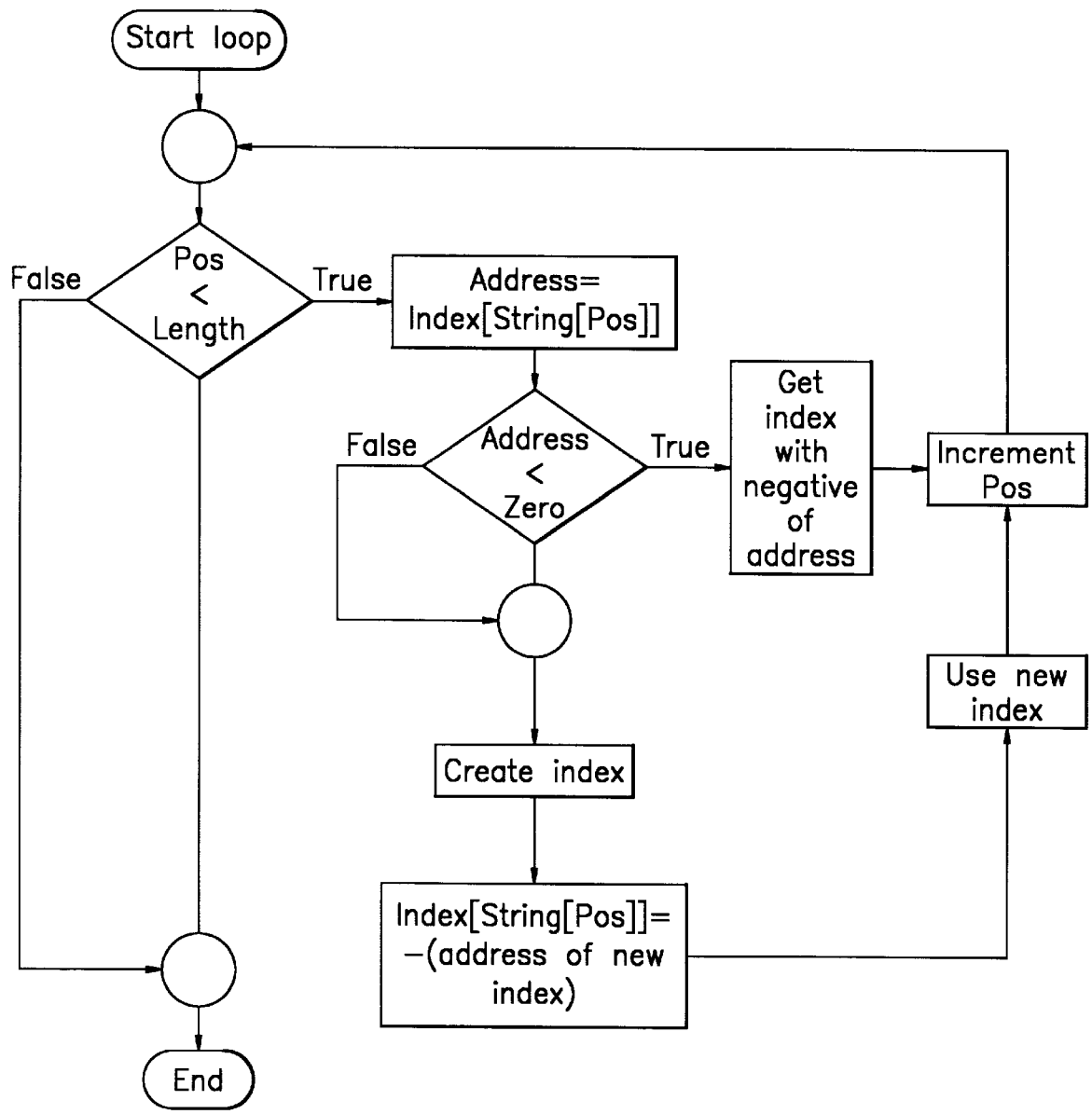
FIG. 8 illustrates an example of an alternate perform loop according to the present invention.

The alternate loop (FIG. 8) is similar to the one above, except positive values and zero are not tested for. If either is reached, a new index must be created with a pointer pointing to it. This can be much faster since no intermediate record must be retrieved in the process of inserting records.

After the loop, the final character is read and used to find a new address within the current index (FIG. 6A—step 70). If the "Address" is a negative value, the position of the record is given to the duplicate (FIG. 6A—steps 72, 74). If the "Address" is a positive value, a new duplicate must be created and pointed to by the index (FIG. 6A—steps 76, 78, 80). The address, or record location, of the record being inserted are then put into the duplicate segment (FIG. 6A—steps 78, 82). If the "Address" is zero or empty, the index is given the position of the record (FIG. 6A—step 84).

Figure 9:
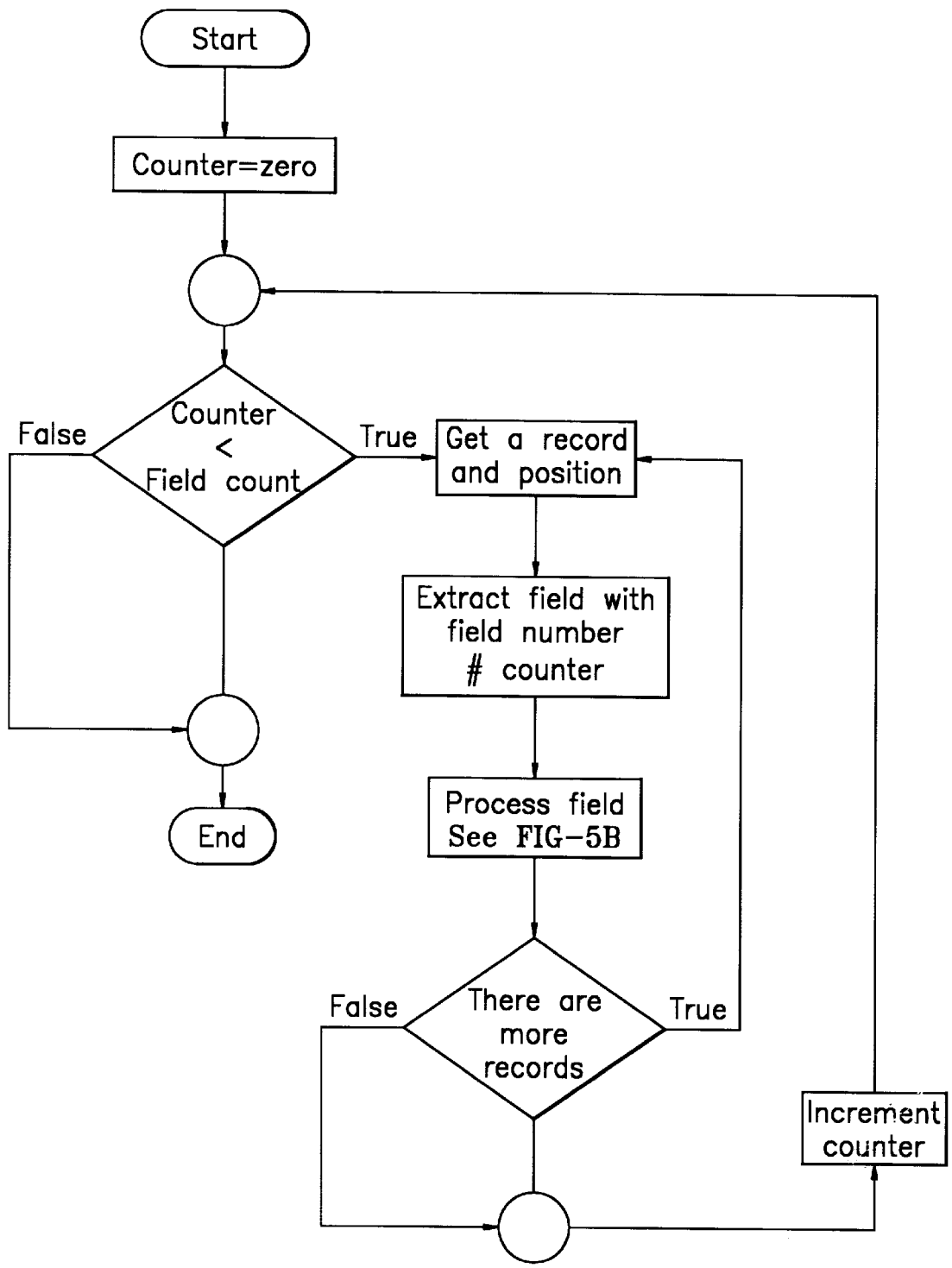
FIG. 9 illustrates an example of a flowchart of a quick insert method for loading multiple records according to the present invention.
Figure 10:
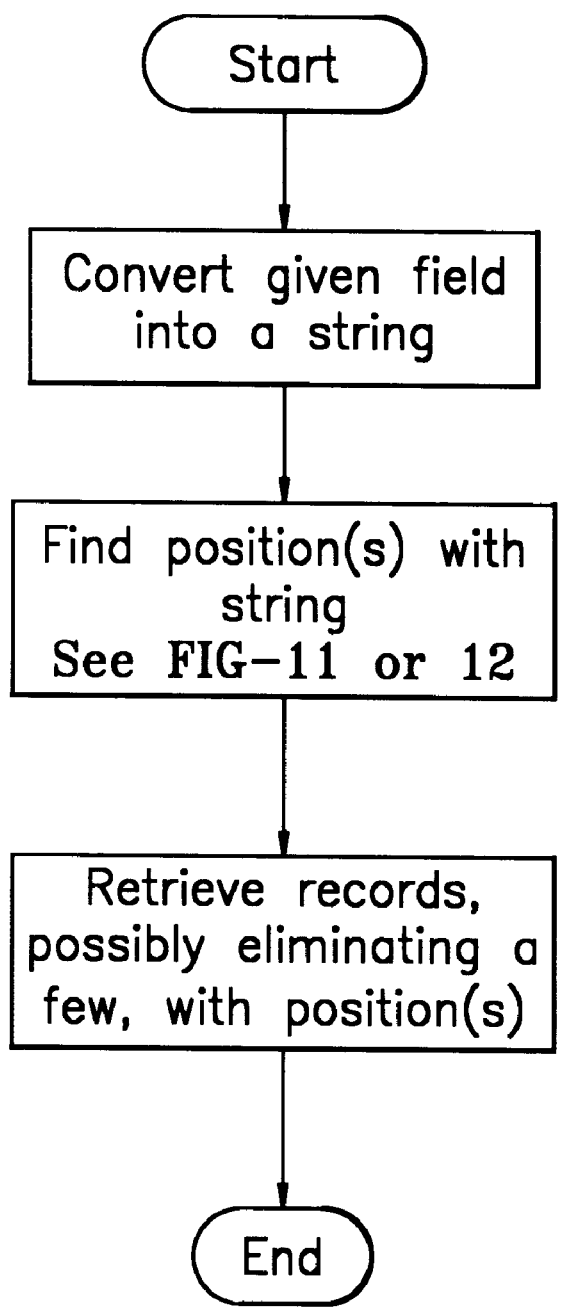
FIG. 10 illustrates an example of a flow diagram of finding a record according to the present invention.
Figure 11:
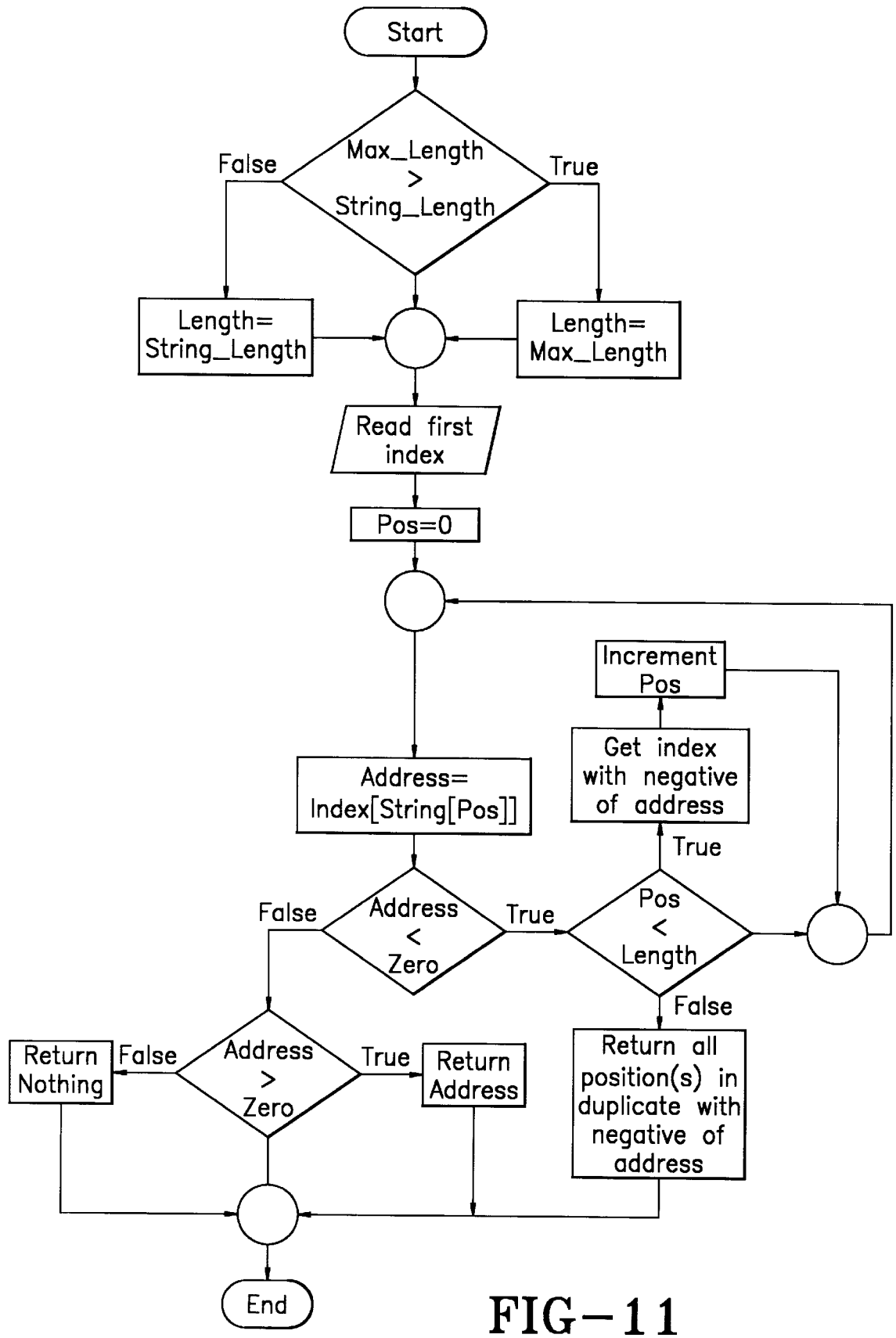
FIG. 11 illustrates an example of a flow diagram of finding a record position or location according to the present invention.
Figure 12:
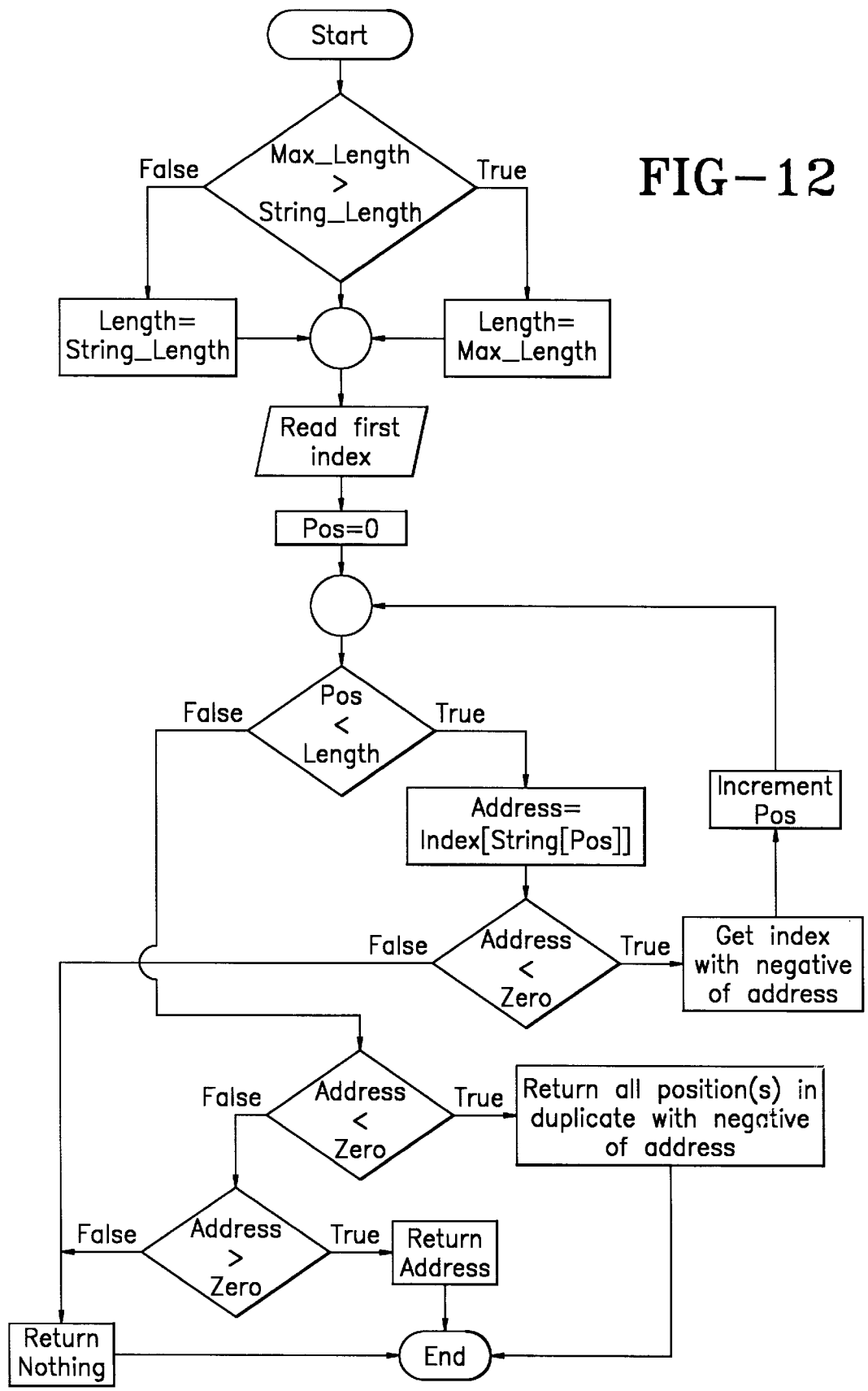
FIG. 12 illustrates another example of a flow diagram of finding a record position according to the present invention.

If the index and duplicate segments are kept in a very fast memory schema, then the records could be read sequentially. If memory is a problem, one could consider using the flowchart of FIG. 9. This process only focuses on one field at a time and cycles through the records sequentially for each field. This is a very fast process. The process of finding strings is similar to how records are inserted. If an empty address is found, no records are returned. If a positive value is found, the record with that address is returned. If a negative value is found, duplicates are used to return records. Of course, if negatives are found before the string length or the maximum allowable length is reached, the next index is read in and the process above repeated. This is shown in FIGS. 10–12.

The duplicate segment is preferably a wide-linked-list with possibly a couple of extras, such as a pointer to the last segment in the first segment, to speed up insertions. A sorted flag may also be used if records need to be sorted when retrieved.

Sorting any number of records may be done with a recursive algorithm that walks through each index. It should append positive values to a file. For example, when there are duplicates, one may write a negative count, of each of the addresses within the duplicate followed with each of the actual addresses within the duplicate. Once this process is complete, the records may be sorted using the addresses just created, sorting where the negative count was found. Indexes may then be reconstructed setting the sorted flag. All retrievals may be sorted with the sorted flag set.

The following example of the present invention illustrates a database system of stored, numbers. As discussed above, the numbers are stored in a container, or memory location Indexes are created based on the characters (i.e. alphanumeric, numeric, symbols, or objects) of the data objects stored in the records. The following examples are meant to follow each other. Initially no records are stored. As each example is completed another record is stored. In the foregoing example, the records only contain a single field that is numeric. These examples are not intended to model any particular real life situation, but are disclosed for the purpose of providing a simple working example of the present invention.

EXAMPLE #1

Figures 14, 15:
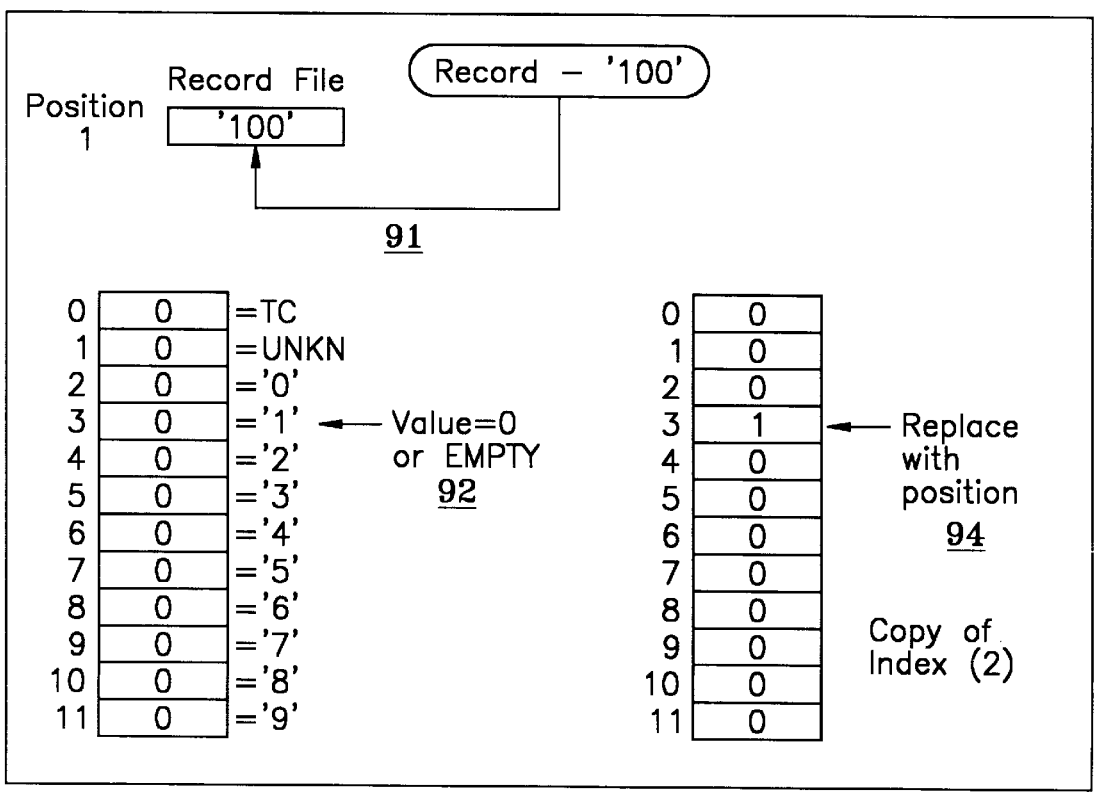
FIG. 14 illustrates an example structure of an index corresponding to a number mask of the present invention.
FIG. 15 illustrates an example of the present invention.

Insert a record with a field value "100" (FIGS. 13, 14, 15).

Create a numeric mask (FIG. 13—88) and convert the field value "100" to 3,2,2,0 (the field values in this example are 0–11).

Create an empty index segment which corresponds to the numeric mask created above (FIG. 14—90).

Add the given record to a record file and obtain a position (or address). The logical position for record "100" is "1" 91.

Check the location of the first index, or the one just created, corresponding to the first number (character). Again, the index locations contain either a designation of EMPTY, FULL (pointer to a record), or POINTER (pointer to another index). (It should be noted that this first character may be the first number of the record, the last number, or a middle number. In other words, records may be indexed and searched from any order.)

Since the value of the index location corresponding to the first character of record 1 is EMPTY 92 (the first character of "100" is the "1"), replace the value in the index location with the position of the record within the record file 94.

EXAMPLE #2

Figure 16:
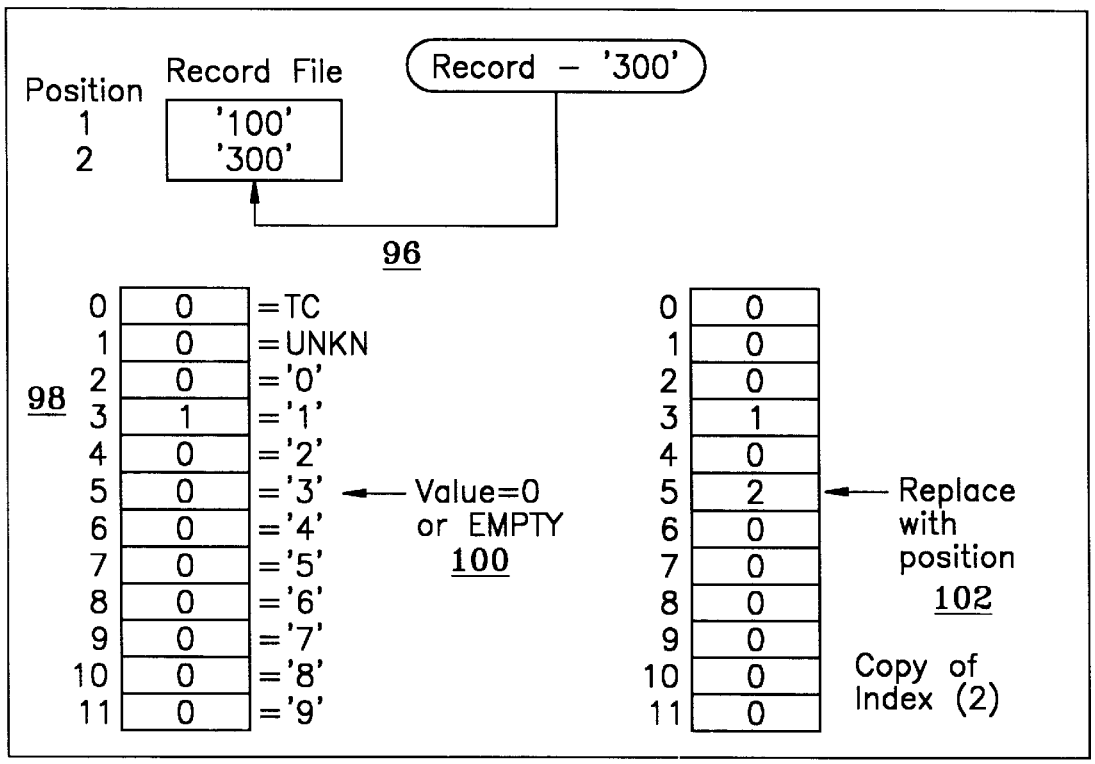
FIG. 16 illustrates another example of the present invention.

Now insert a record with a field value "300" (FIG. 16).

Use the numeric mask to convert value "300" into 5,2,2,0.

Add the given record to a record file and obtain a position 96. (Now the logical record position of "300" is "2").

Access the first index segment 98. Check the index location of first index corresponding to the first character of "300", which is "3". Or, in other words, the index location is checked with the first number as a position of the converted string for a value of (EMPTY, FULL, POINTER) 100.

Since the value of the location relating to character "3" is EMPTY, replace the value in the index location with the position of the record within the record file (position "2") 102.

EXAMPLE #3

Figure 17:
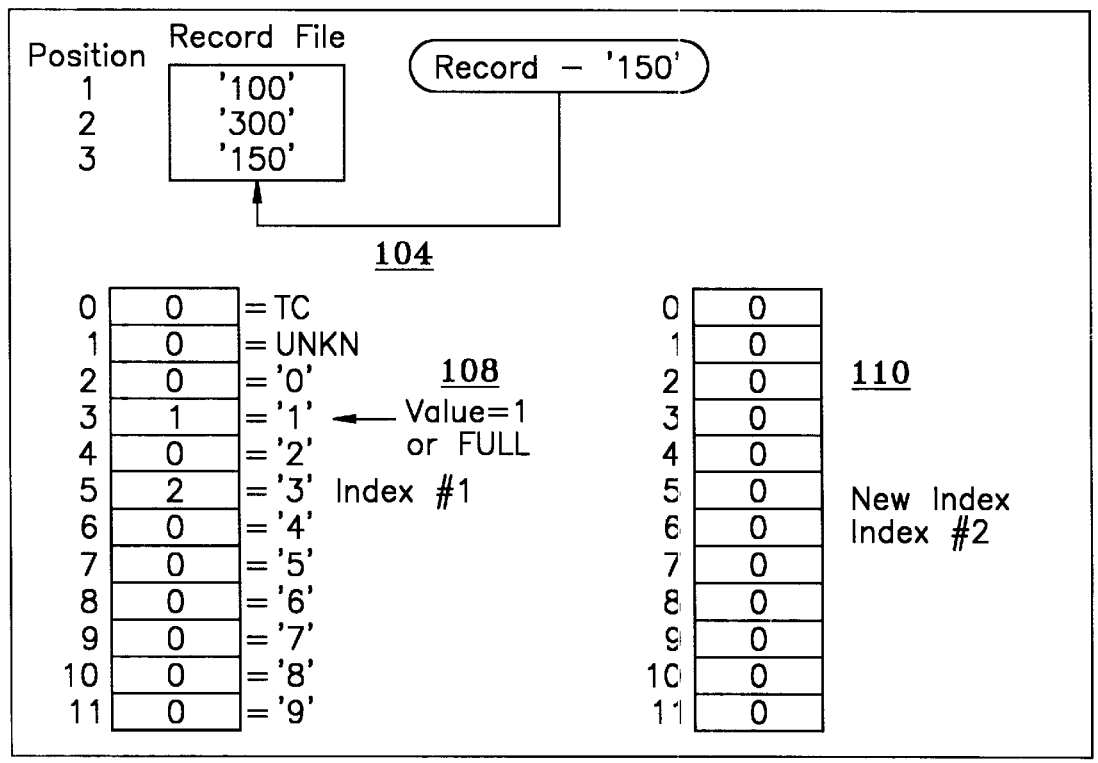
FIG. 17 illustrates another example of the present invention.

Now, insert a record with a field value of "150" (FIGS. 17, 18).

Use numeric mask to convert field value "150" into 3,7,2,0.

Add the given record to a record file and obtain a position, position "3" 104

Access the first index 106. Check the index location of the first segment corresponding to the first character of record "150", which is a "1". Again, the first index is checked with the first number as a position of the converted string for a value of (EMPTY, FULL, POINTER) 108.

Since the value is FULL, a new index is created 110. In other words, the index location corresponding to the first character "1" is FULL since record 1, "100" has already been indexed.

The FULL value of the index location of index segment 1 corresponding to the first character of "1" is swapped for a POINTER to the new index segment, index segment 112.

Retrieve the record corresponding to the previously FULL index location from within the record file.

Convert the field value "100" into 3,2,2,0.

Replace the EMPTY index location of index segment #2 corresponding to the second number, or character, of the newly retrieved record with the position of that record within the record file 114. In other words, since the second character of record 1, "100", is "0", replace the value of the index location of index segment #2 corresponding to character "0" with a FULL.

Check the new index location of the new index (index segment #2) corresponding to the second number of record 3 ("150") for a value of(EMPTY, FULL, POINTER) (step 20).

Since the value corresponding to the second character of "5" is EMPTY, replace the value in the index segment with the position of the record 3 within the record file 116.

EXAMPLE #4

Figure 19:
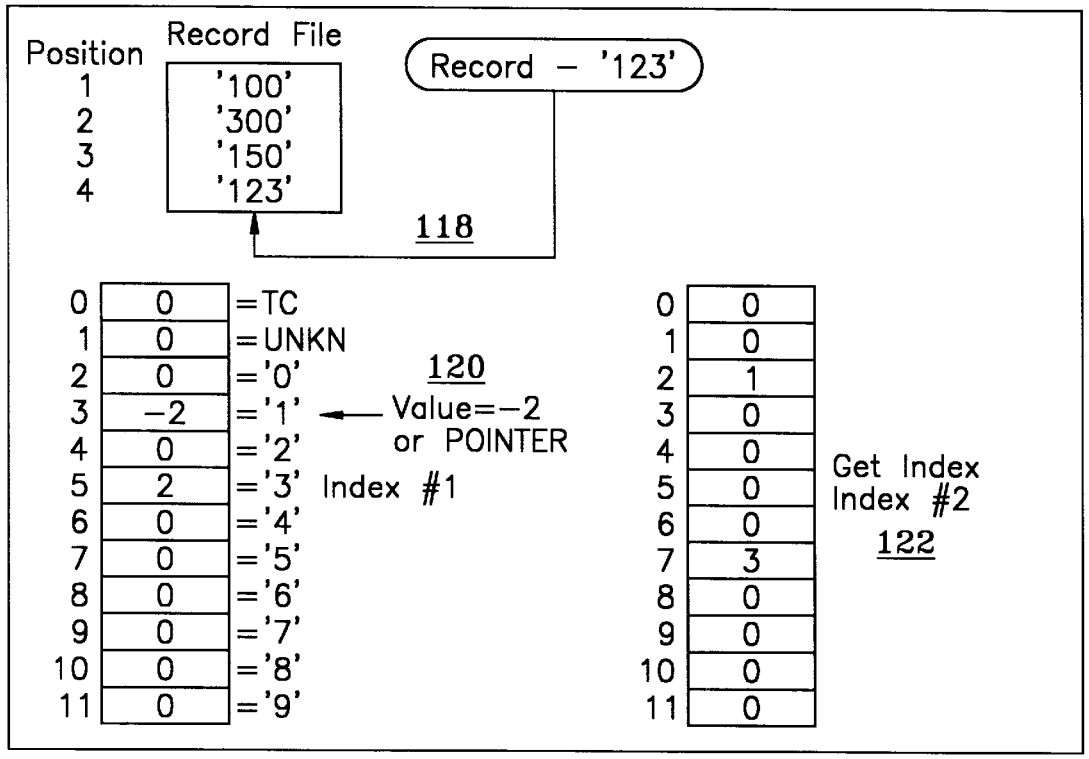
FIG. 19 illustrates another example of the present invention.
Figure 20:
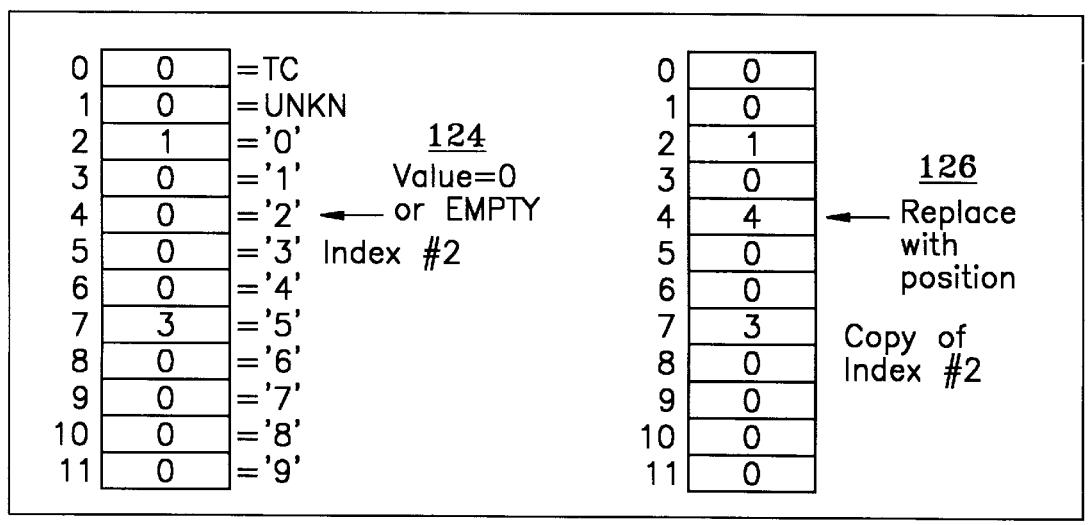
FIG. 20 illustrates another example of the present invention.
Figure 21:
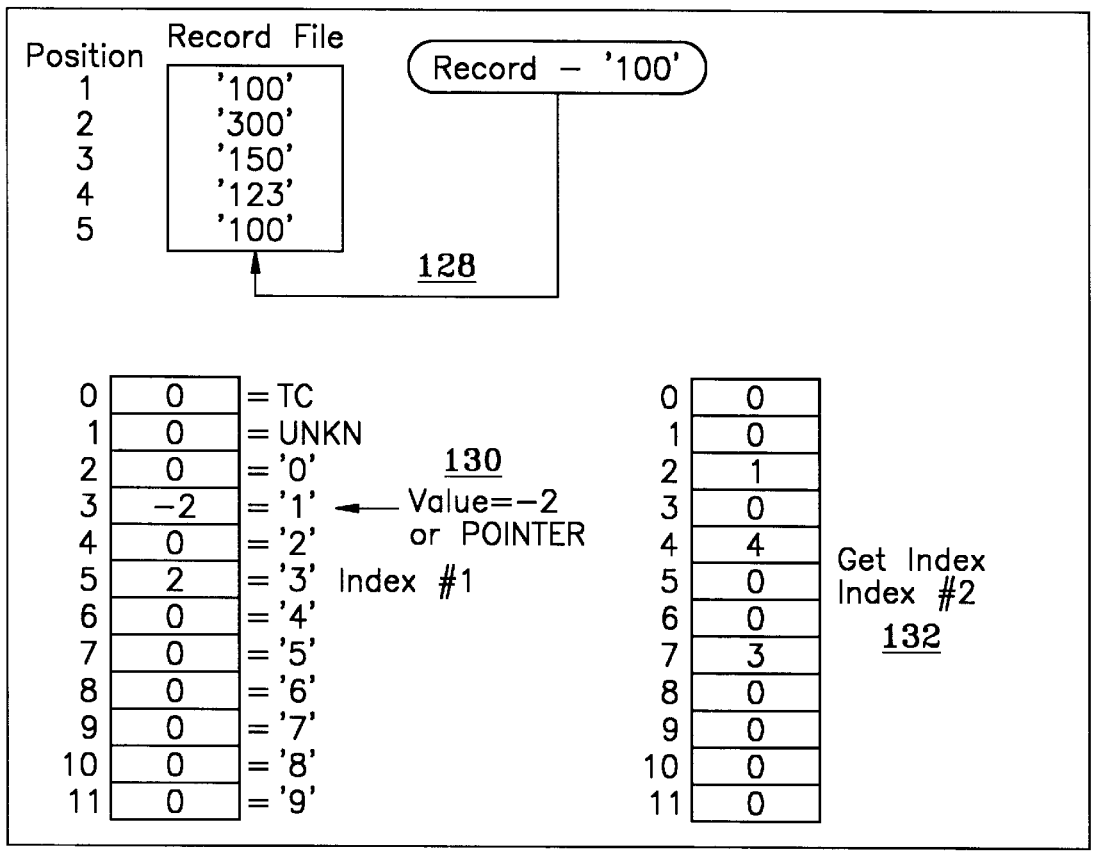
FIG. 21 illustrates another example of the present invention.

Now, insert a record with a field value of "123" (FIGS. 19, 20).

Convert the field value "123" into 3,4,5,0.

Add the given record to the record file and obtain a position (position 4) 118.

Check the first index with the first number as a position of the converted string for a value of (EMPTY, FULL, POINTER) 120. In other words, check the location of the first index corresponding to the first character of record 4.

Since the value is POINTER, read in new index 122.

Check the new index with the second number as a position for a value of (EMPTY, FULL, POINTER) 124. In other words, check the location of the second index corresponding to the second character of record 4. The second character of "123" is "2".

Since the value is EMPTY, replace the value in the index location with the position of the record (record 4) within the record file 126.

EXAMPLE #5

Now, insert a record with a field value of "100" assuming duplicates are allowed (FIGS. 21–24).

Convert the field value "100" into 3,2,2,0 (recall "100" has already been entered once).

Add the given record to a record file and obtain a position, here position 5 128.

Check the first index with the first number as a position of the converted string for a value of (EMPTY, FULL, POINTER) 130.

Since the value is POINTER, read in new index 132.

Check the new index with the second number as a position for a value of (EMPTY, FULL, POINTER) 134.

Since the value is FULL, a new index is created 136.

The FULL position must be swapped for a POINTER to the new index segment 138.

Retrieve the record with FULL as a position to it within the record file. (In other words, the original "100" of record 1).

Convert the field value "100" into 3,2,2,0.

Replace the EMPTY location of index #3 pointed to by the second number of the newly retrieved record's converted string with the position of that record within the record file 140.

Check the new index with the next or third number of record 5 as a position of the converted string of the record being inserted for a value of (EMPTY, FULL, POINTER) 142.

Since the value is FULL, a new index, index segment 4 must be created 144.

The FULL indicator must be swapped for a POINTER to the new index segment 146.

Retrieve the record corresponding with the FULL value of index.

Convert the field value "100" into 3,2,2,0.

Replace the EMPTY address pointed to by the fourth number of the newly retrieved record's converted string in the index with the position of that record within the record file 148. In other words, since there is no fourth number in "100", the location of the index segment will be the terminating character or "TC" location.

Check the new index (index segment #4) with the next or fourth number of record 5 as a position of the converted string of the record being inserted for a value of (EMPTY, FULL, POINTER) 150.

Because the value is FULL and the terminating character has been reached, the index will no longer work. In this example, the index only works with one address in each position. A duplication file may be created to hold multiples of the same string. The sorted flag may be a short count on the number of records sorted. Since none of the records being inserted are sorted, this may be left to zero. Each duplicate may contain a position or address.

Add a duplicate to the duplication file saving its address or position 152.

Swap the FULL value in the index segment #4 with a POINTER to the duplicate 154.

Add the FULL position to the duplicate 156.

Add the position of the record within the record file to the duplicate 158.

EXAMPLE #6

Now, find all record(s) with a field value of "200" (FIG. 25).

Convert the field value "200" into 4,2,2,0.

Check the location of the first index corresponding to the first number of the record to be searched 160.

Since value is EMPTY, return no records.

EXAMPLE #7

Find all record(s) with a field value of "100" ( FIGS. 26, 27).

Convert the field value "100" into 3,2,2,0.

Check the first index with the first number as a position of the converted string for a value of (EMPTY, FULL, POINTER) 162.

Since the value is POINTER, get index segment pointed to by POINTER 163.

Check the new index with the second number as a position of the converted string for a value of(EMPTY, FULL, POINTER) 164.

Since the value is POINTER, get index segment pointed to by POINTER 166.

Check the new index with the third number as a position of the converted string for a value of (EMPTY, FULL, POINTER) 168.

Since the value is POINTER, get index segment pointed to by POINTER 170.

Check the new index with the fourth number as a position of the converted string for a value of(EMPTY, FULL, POINTER) 172.

Since the value is POINTER and the terminating character has been reached, the POINTER must be pointing to a duplicate. Retrieve all records with addresses found within the duplicate 174.

EXAMPLE #8

Find all record(s) with a field value of "340" (FIG. 28).

Convert the field value "340" into 5,6,2,0.

Check the first index with the first number as a position of the converted string for a value of (EMPTY, FULL, POINTER) 176.

Since value is FULL, return the record pointed to by FULL within the record file.

The record returned has a field value of "300".

The present system at this point may be implemented in various ways. As illustrated, the retrieved record "300" does not match "340". This may be advantageous since the storage/retrieval system possibly returns the 'closest match'. This may happen when a single record is returned or only a given number of characters are indexed. One way of avoiding this is by creating indexes for the entire record (indexing to the terminating character). This is illustrated with flowcharts of FIGS. 5A, 5B, 6A, and 7.

Searches of the index structure of the present invention may be performed in various ways. For example, searches for all records having a particular data object may be retrieved. Additionally, boolean searches (AND, OR) searches may be conducted. Additionally, wildcard searches may be performed which retrieves all records containing a predetermined, truncated, string of characters (e.g. searching for all records starting with "Jo" will retrieve "Joe", "John", and "Jonathon"; or searching for "Jo?n" will retrieve "Joan" or "John" etc.). Accordingly, a user may search for a group of data objects stored in an index tree structure of the present invention by use of a wildcard. Searching for a group of data objects by use of a wildcard is comprised of the steps of:

a.) entering a search request of a string of search characters followed by a wildcard character (e.g. "Jo?");

b.) following a path down the index tree structure based on the string of search characters, said path terminating at a wildcard index array (e.g. Go to the "J" position of the first index array which points to a second level index array; go to the "o" location of the second index array that points to a third level index array; go to the third level index array (this is the "wildcard index array"));

c.) expanding the search to utilize all locations of the wildcard index (e.g. Follow all the locations of the wildcard index array until all relevant records are found (ignore empty designators)); and d.) retrieving all records pointed to by the index arrays following from the wildcard index in the index tree structure (e.g. "Joan", "John").

The duplication file is preferably made up of a wide-linked-list-array. This array may vary in size. For optimal performance with insertions and retrievals, a count, a pointer to the next duplicate, a flag for sorting purposes, and a pointer to the last duplicate may be placed within the first duplicate from the index. Each additional duplicate may only contain a pointer to the next duplicate. If the records are inserted into the record file in such a way that the position always increases, the duplicate will always be sorted by number. By placing all new indexes, duplicates, and records at the end of the file, the position will increase. The end of the file is usually the optimal place to put data into a file anyway. This allows for fast multiple qualification by AND-ing two sorted lists of numbers without looking at the records. Also, if the record file is initially sorted, retrievals will be sorted as long as no additional records have been added to the given duplicate. If the duplicate has a flag for sorting purposes, this may be checked to see if the records need to be sorted. Because of the nature of the index, less than and greater than operations may be performed with a recursive algorithm searching through the indexes.

The method of the present invention may be used to index data that has already been stored in memory. For example, data that has been stored on CD-Rom may be indexed by the present invention so that the data may be searched for rapid retrieval. For example, a CD-Rom database of all radio stations in the United States and their respective addresses may be indexed according to the present invention. For example, the address field of the data may be indexed. The actual address of each complete record (e.g., each radio station) may be used as the record location for each address field. Accordingly, a search for all addresses with the street name "Main Street" will return a search result of all records of radio stations located on Main Street. It is preferred that the data is scanned sequentially using the absolute or logical addresses of each record to create the index. Accordingly, the present invention has wide application to databases that currently exist in an unstructured format.

Additionally, the method and system of the present invention may be used to index data which has not yet been entered into memory. For example, if the record is not present, the record is inserted (i.e., appended to the container) and the logical or absolute address of the new record is used within the index. The present invention allows for the container of the records to be of practically any format as long as the records can be identified by some number. This identification is usually accomplished by using the record number or the actual offset of the given record within the container.

An example application of the present invention will now be discussed. The text of the Bible may be stored as digital data. In one embodiment the text of the Bible may be stored in the following form, where each record has the following fields:

Book, Chapter, Verse, Text.
Where, for example, Record 1 (having Position 1) is:
Book: <John>
Chapter: <3>
Verse: <16>
Text: <For God so loved the World that he gave his only begotten son, that who so ever believeth in him will not perish but have everlasting life.>
For example: "For God so loved the World" converted to a string of (using the alphabetic mask of FIG. 13):
For=7,16,18,0
God=8,16,5,0
so =20,16,0
Loved=13,16,23,6,5,0
the=21,9,6,0
World=24,16,19,13,5,0

These strings are indexed separately according to the previously described flowcharts of the application. With each word in the text field having the same record location, or "POSITION". Thus, each separate field or word for Record 1 will point to Position 1.

Record 1 above (John 3:16) has only one "Position" or address, i.e. Position="1". Then a search for "God" or "John" or "3" will retrieve Record 1 because the indexes all contain pointers to Position "1".

Records may be deleted similarly to the data insertion methods of the present invention. That is the indexing steps taken to index the particular data record may be reversed in order to delete the reference to the deleted record in the index structure.

Records that are indexed according to the present invention may also be sorted similarly to the method for searching singular records. For example, in a numerical index structure, all numbers in a database between 200 and 300 may be retrieved by starting at the locations of the top level index relating to the characters "2" and "3" and working down through the index to retrieve all the records between 200 and 300. Data can also be found using wildcards, i.e. by searching layers of the index that are wildcarded and continuing to search where empty or null designations are not found.

Where the application states, for example, that: "The plurality of locations of the first level index array corresponds to a list of predetermined characters", "corresponds" means that each location of an index relates to a particular "character". For example, where only single digit numeric characters of the a data object are to be used to index the data, an index array having 10 locations may be used with one location "corresponding" to each single digit numeric character from 0 to 9 (if the alphanumeric characters of the data object are used to index the data objects, it is preferred that there be a location in the index corresponding, or relating, to each character in the alphabet). Again, a "character" as used in this specification may be an alphanumeric character, a numeric character, a symbol, an object, or a group of characters.

In FIG. 3, as discussed earlier, a provision was made in the invention for "UNK" unknown or characters not defined in the mask. A typical index block has a position retained for every expected character. By using the "UNK" position, the important or expected characters are in the mask and positions for them are reserved in the index block. The less important, or unexpected, characters are represented by the "UNK" position in the index block. The characters that are not in the mask could be ignored, but then different strings could give the same result, e.g., such as "123–456" and "123456"– if the dash is ignored in indexing, then both strings would appear the same in the index with the same index length, while in actuality they are not. By using the "UNK", as in FIG. 3, the "–" would reside in the "UNK" position in the forth index block for "123–456". The present invention, by providing for "UNK" characters, allows indexing all positions of the field. Multiple positions in the index block(s) do not need to be set aside in the mask and index block(s) for infrequent or non-relevant characters—this provides another form of "compression" of the index blocks, i.e., arrays. As discussed, in the Summary of the invention, the indexing method of the present invention may be combined with other known database technologies such as B-tree, Hash, Direct Access, Sorted Set, Unsorted Set, by having a location in a predetermined index point to the other known database technology. This hybrid indexing system is advantageous in that it combines the high speed indexing and retrieval of the present invention with the other known technologies which do not require as much memory for storing indexes.

Hybrid Example 1

Create a hybrid indexing schema where the first five characters of any string in a database are indexed according to the indexing schema of the present invention while any character after the fifth is indexed according to another known technology (e.g. B-tree). In order to index the name "Johnathon" into an index using such an indexing schema, the first five characters ("Johna") would be placed in the present invention's indexing structure using the methods previously described. The fifth index level would then point to the other known database technology where the other known database technology is used to index the last four characters ("thon") (E.g. A B-tree index structure would be used to index "thon"). (If B-tree is used for the other database structure, it is preferred that separate B-tree structures be created for indexing each different stored combination of the first five characters).

It is also appreciated that the other known technologies may be used first to reduce the amount of indexing for the indexing structure of the present invention.

Hybrid Example 2

Create a hybrid indexing schema where the first five characters of any string in a database are indexed according to the indexing schema of any known database technology (e.g. B-Tree) while any character after the fifth is indexed according to the indexing schema of the present invention. In order to index the name "Johnathon" into an index using such an indexing schema, the first five characters ("Johna") would be indexed using the known database technology and where the other technology would then point to the indexing structure of the present invention which would then index the last four characters according to the method previously discussed.

It is appreciated that the order in which the different database technologies are merged and the number of characters indexed with each character can vary.

Having shown and described a preferred embodiment of the invention, those skilled in the art will realize that many variations and modifications may be made to affect the described invention and still be within the scope of the claimed invention.

For example, embodiments of the indexing system of the present invention may vary based on:

1.) How the data objects are converted: It is preferred that an alphanumeric, or numeric, mask as illustrated in FIG. 13 be used to convert a data object into a string to be indexed. The mask may be as large, or small, as required, accommodating the indexing of data based on characters such as alphanumeric characters, numeric characters, symbols, objects (i.e. a code representing a color, graphic, or sound), or groups of characters at a time (In other words, a string of three characters may be grouped together and converted into a single string character representing a single location in an array). The masks may define a character or a group of characters in any order, e.g. A to Z, or Z to A. It should also be appreciated that different levels of index segments can have different masks (thus providing a level of encryption). However, in an alternative embodiment, a mask may not be required at all.

2.) How the data objects are indexed: The data objects may be indexed from left to right, or right to left, or from the middle of the character out. The data objects may also be indexed sequentially or in any other predetermined pattern.

3.) What is stored in the index locations: In the preferred embodiment, the index stores either a pointer to a record location, an EMPTY designator, a pointer to another array, or a pointer to a duplicate segment. In an alternative embodiment, the data object indexed may be stored in the index location. It is also appreciated that the locations of the index arrays can contain pointers to other independent index structures.

4.) How to designate the elements stored in the index locations as an index pointer, an EMPTY designator, or a "non-index" element (i.e. a record location, or the actual data object or value): In the preferred embodiment, negative numbers are pointers to another array within the index; positive numbers are the other non-index elements; and the zero character is a null or empty designator. In an alternative embodiment, ranges of positive values or ranges of negative values, or both, may be used to designate the class of the index elements.

5.) How to store the data objects in the record container: They may be stored as variable length records or of a fixed length record. They may, or may not, be in a compressed format.

6.) How to formulate record locations: The stored record locations may be actual or logical addresses.

7.) How to store the index structure: The index structure may be stored, for example, on magnetic disk, non-magnetic disks (e.g. optical lens) or Random Access Memory (RAM).

8.) When to break out the index structure and how far. For example, there are three basic ways to break out the index structure of the present invention:

i.) to create new index segments only when a duplicate record has been reached;

ii.) to completely break out the entire index structure from the start to accommodate all possible combinations of the predetermined list of characters (i.e. pre-expanding the index structure with all the locations within the indexes set initially to an empty or null designation); or iii.) break out the entire index structure for each data object or record indexed, regardless of whether there is a duplicate or not (Since the entire field is represented in the index structure, this allows validation of the data of the database without having to actually retrieve the data objects).

Figure 29:
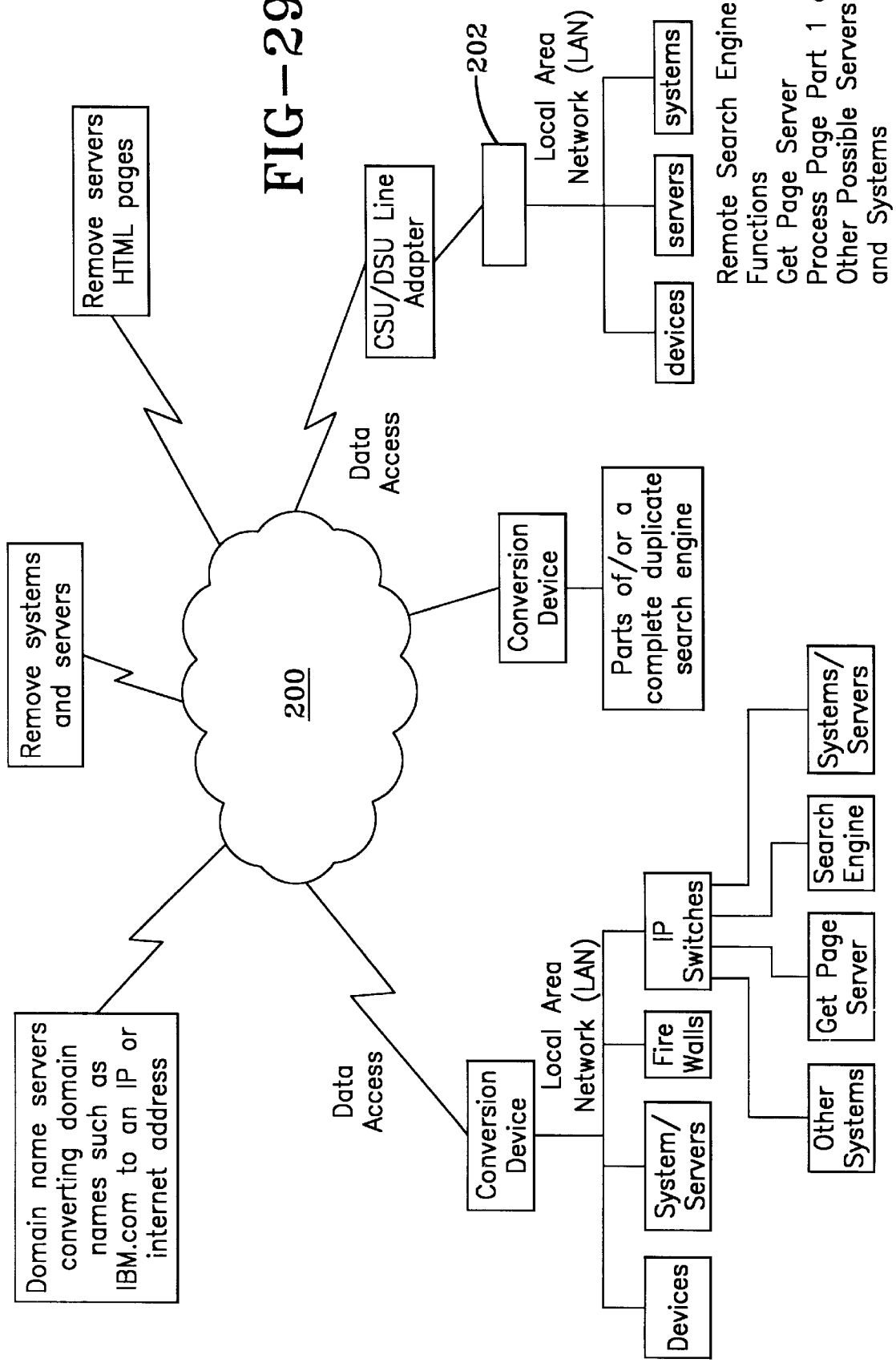
FIG. 29 illustrates an example of a graphical depiction of the Internet.

FIG. 29 illustrates the Internet 200, made up of a collection of systems, servers, computers, routers, switches, services and devices linked through a network of multi-connections made up of fiber-links, leased data lines, wireless connections, satellites, local area networks (LANS) and other networking media and connections. The Internet 200 includes computers, systems, resources, devices and servers that provide services such as Domain Name Servers (DNS routing that converts domain names such as ibm.com to an IP address so connections and the passing of information and data can be established between programs and devices), routing of data across the network, transfer of files, e-mail and many more uses. The Internet 200 provides access to tens of thousands of servers or more containing documents, many in HTML (hypertext markup language) format. There are devices such as Cisco's 2501 202 that convert the data from a leased line to a LAN type connection. There are other devices such as switches, routers, firewalls and other devices that allow for the connection of many systems, servers, users, personal computers and other resources to the Internet 200. FIG. 29 illustrates that the search engine can be connected to the Internet 200 in many locations; locally, nationally or any where in the world where access to the Internet 200 is available. That parts of the search engine(s) can be centralized and/or distributed to other locations on the Internet 200 such as the "get page server", parts of the "process page server", complete copies or parts of the databases or complete copies of the search engine can exist anywhere access is available to the Internet 200. This same collection of services known as the Internet 200 and the associated network of computers is used to access documents in servers and systems (devices), provide services to the search engine users and to coordinate and pass data, files, commands, documents and other information between the search engine(s) and it's functions.

Figure 30:
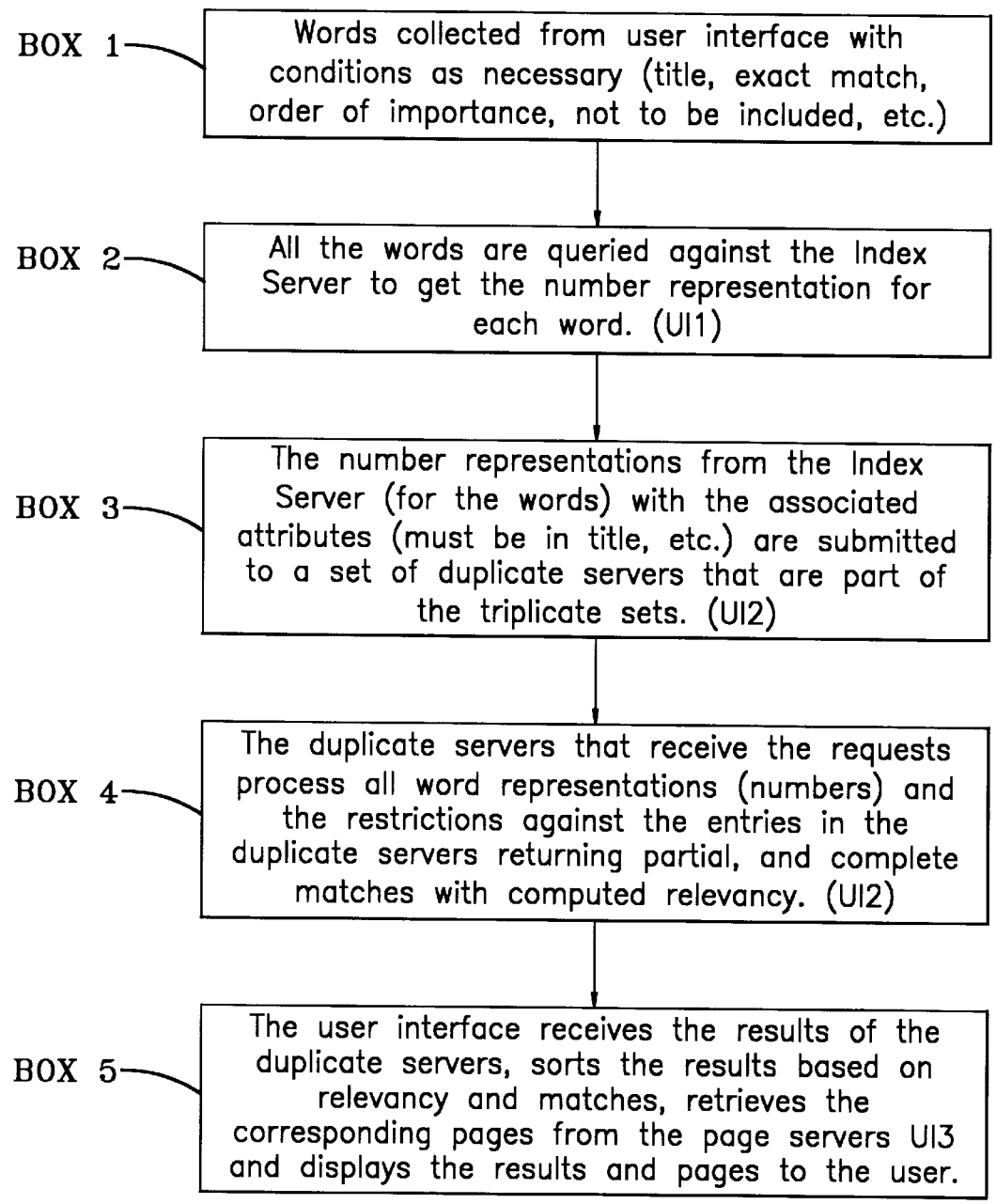
FIG. 30 illustrates an example of a flow diagram of the user interface with the search engine and files within, one example of the present invention and to retrieve and sort documents meeting criteria of the user request.

FIG. 30 illustrates an example of a flow diagram involving the user interface with other parts of the search engine and demonstrates the indexing system as it relates to the index server 206 for words. Box #1 shows that the system has collected search words and possible conditions from the user. In box #2, the words are presented to the (word) index server 206 as shown at point UI1 on both FIGS. 30 and FIG. 32A and 32B. The words in the search engine are eventually converted to and stored as unique numbers. This Index server as described 206 in the search engine system described below is one example of the present invention. As words are presented to the Index 206 as part of a document that is being added or updated, these words either already exist in the Index 206 or are assigned a unique number (through the indexing method) to represent their addition to the Index 206. In the case of a user query as represented in FIG. 30, if they exist, the unique numbers are used to point to documents that contain the words, if unique numbers do not exist for a particular word, that means that no document in the search engine contains the word that is being search for. Words and numbers can be added and indexed as described in the description of the indexing system above. For this example, we will assume that all the words exist in the index to further demonstrate the operation of the index as part of a search engine. The word submitted does not have to be a speak-able or common word. For example "cp2" could be one of the words submitted to the Index server. Using "cp2" as a word, the index server would look at index location "c" in the first level index which in this example corresponds to a character "c", index location "c" contains a pointer to a second level index block. In the second level index block, position "p" contains a pointer to a third level index block. The third level index block, represents all words that began with "cp". The third level index block, in position "2" contains a pointer to a fourth level index block for records that start with "cp2" and the unique number that has been assigned to "cp2" in the terminating character position of the fourth level. If we had to go to the fourth level index block to follow words like "cp2st", in the fourth level index block we would have found the unique number assigned to "cp2" in the terminating character position of the fourth level index block. The word "cp2" takes on a unique number that represents the word "cp2", that the word itself ("cp2") does not exist in the index, but by following the positional offsets and pointers, we determine if it does or does not exist in the index. This process is repeated for all words in the search argument, determining the unique numbers that represent the words in the document using the word index in the search engine. FIG. 30 box #3 shows the unique numbers (representing words) and associated attributes (must be in title, word must not be in document, etc) being submitted to one of several sets of duplicate servers 208 at point U12 in both FIGS. 30 and FIG. 32A and 32B. The duplicate servers 208 are organized by word (the numeric representation) and contain lists of documents that contain the word. These documents are also organized by other attributes of the documents and their use of the "word". The numeric word representations and attributes are given to the duplicate server 208, and sets of results are generated that contain pages that contain the desired word(s) and exclude the specified word(s), and then these sets are sorted in most relevant order based on other attributes. In box #4 the results from duplicate server(s) 208 are passed back to the user interface server to be combined and re-sorted. In box #5 of FIG. 30 the sorted results in the user interface server interfaces with the page server(s) 210 of FIG. 32A and 32B at point U13 to retrieve the corresponding pages (documents) to display to the user.

Figure 31:
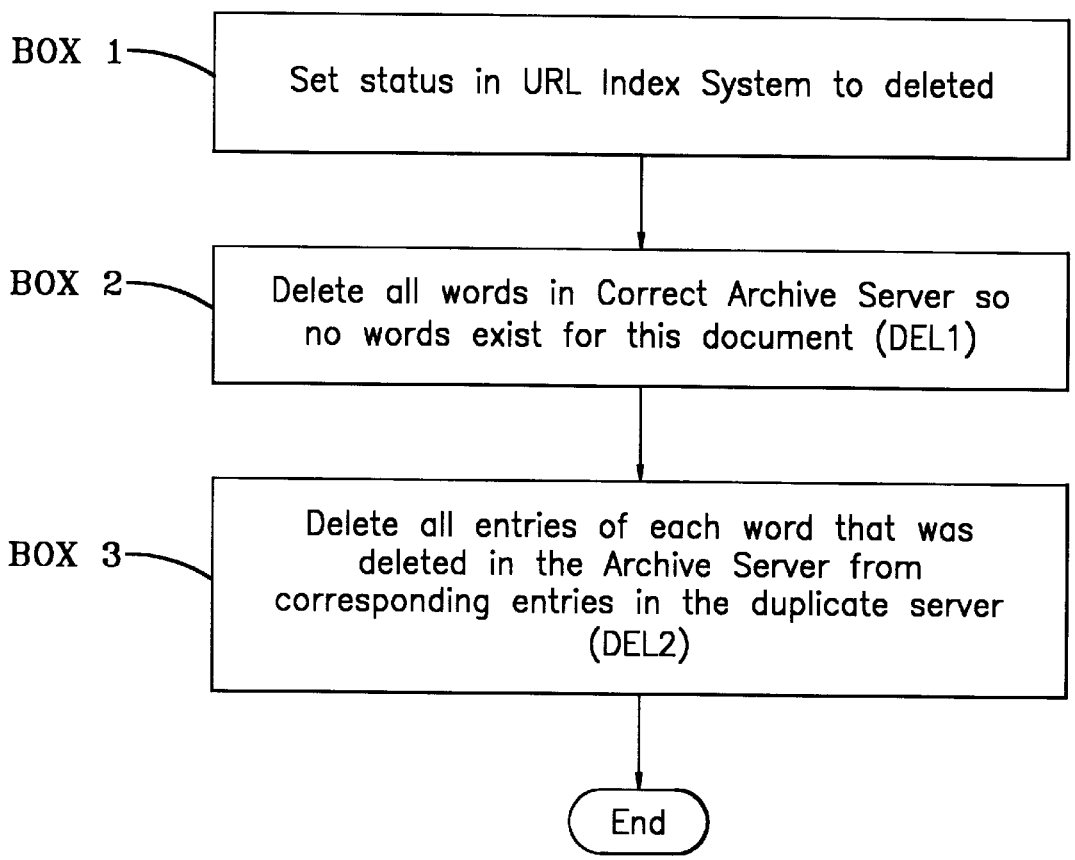
FIG. 31 illustrates an example of a flow diagram for deleting web pages from the files within the search engine.

FIG. 31 illustrates an example of a flow diagram to delete a document from the Search Engine. The URL index as discussed in box #1 of FIG. 31 is another example of the present invention and will be explained further in the discussions of FIGS. 32A and 32B. As part of FIG. 31, in box #1 the corresponding URL data record in URL server 212 is set to deleted. (Note, if the URL is reused by the owner of the URL address at a later time, the status will again change to updated, and the updated replacement document will be added—or the history of the URL can be deleted and the space reclaimed, or other possible variations). FIG. 31 box #2, the Archive server 226 relating to a given URL, would contain a list of all the words (the numeric representation) and attributes contained in that document. Since the document has been deleted, all the words in the Archive server 226 listed for this document and any corresponding attributes will be deleted, see FIG. 32B point DELI. FIG. 31 box #3, the corresponding page entries and their attributes as it relates to words are deleted out of the corresponding Duplicate server 208 see FIG. 32B point DEL2.

FIGS. 32A and 32Billustrate a block diagram of some of the servers in the search engine, some of the typical flow of information and files and some of the functions. Files are transferred between and within the servers. A file communication protocol with recovery and other features is used between the various servers (FCP). FIGS. 32A and 32B illustrate three different uses of the present invention, one of which was discussed in the FIG. 30 discussion (word index server) and the other two will be covered in this FIG. 32 discussion.

In FIGS. 32A and 32B several of the servers in the search engine are illustrated, but other servers such as instant adds, instant updates, re-updating existing pages, user interface and many other servers and functions that are also part of the search engine system and servers and systems outside of the search engine are not shown. In FIGS. 32A and 32B, these servers represent groups of programs, data, files, functions, routines and other devices that interact to provide a function or functions to other servers in the search engine. These servers and all or some of their associated files and/or services and/or functions and/or devices (encryption, compression, and other); can exist in a single computer, a server can exist in multiple coupled or linked computers at a centralized location, a server can be distributed across several computers at one or more locations, a server function can be mirrored or replicated at one or more locations, a server function can exist in whole or part at one or multiple locations in multiple computers and the work, processes, files functions and information can be divided based on rules such as even and odd; hash; mod, proximity, load, singularity, other and in combination.

In FIG. 32, the first server shown is the URL (uniform resource locator) server 212. URL's are used to locate on the Internet HTML documents, images, audio, video, programs, binary files, domains, servers, computers, devices, functions, other files, and combinations thereof. URL's can be very long in length, usually over 8 to 30 characters, and in some cases exceeding 150 or more characters in length. The URL index server in the URL server in the search engine is one example of the present invention. Initially, a seed file of URL's is submitted to the URL server. Using the index technology, each entry is indexed into the index server of the URL server. For example, if the first URL seed entry is "easyresults.com/support/htl" this 27 character string is presented to the URL index server. Using the first letter of the string "e" in the first level index in position "e" a pointer is placed to a second level index. Using the second letter of the string "a" in the second level index in position "a" a pointer is placed to a third level index. Not all characters of the URL may be indexed. Also, certain characters may have the same position. For example, the back slash could map to the same position as the period. Another more common example is mapping upper and lower case characters (A and a) to the same position within the level. In this case the back slashes will be included, so 27 levels of the index will be needed for the URL to be represented. In the $28^{th}$ level in the terminating character position the URL-ID number will be there. This URL-ID number is unique and represents in this case the 27 character URL in the search engine. In the URL server there are others files as well. One file is a direct indexed fixed length record file by sequential URL-ID that contains attributes about the URL that are contained in the URL server such as: Popularity rating, remote links, size of page, page server, page server position, date last seen, date last updated, date of next check, and various flags and statuses such as deleted, in process, and so forth. Another file in the URL server is a variable length record file that contains the URL-ID and the actual URL with all the special characters; this file provides for backup and rebuilding of the URL index with different attributes, and has other uses in the search engine as well. The URL server(s) receives files and requests for data and functions from the Process Page server(s), the Index (word) server system, the Split server, and numerous other servers in the search engine and from possible other servers outside the search engine. The URL server(s), after adding new URL's to the index, then creates files of new URL's discovered, retrieves the IP addresses from the DNS server, and creates files that are passed on to the next server(s), the Get Page server 216.

In FIG. 32, the second server shown is the Get Page server 216. This server 216 is also commonly referred to as a "web walker", "spider", "browser", "robot" and other names in the industry. This server216 requests files from the URL server as needed, and then using the URL and IP addresses, the Get Page server 216 then requests the documents as a user would on the Internet (web). The Get Page server 216 has the ability to follow pages that are make up of other pages and requests the IP address form the DNS server on the Internet. The Get Page server 216 collects files that are representative of the URL's it received from the URL server and pages it followed as it was forwarded (like a user would be). The Get Page server 216 also processes requests and functions, and makes requests and functions of other servers in and out of the search engine. The Get Page server 216 , as all or most servers, can exist at remote and local sites and can contain multiple copies of itself on a computer system(s). The Get Page server 216 builds files of its results to pass on to other servers as requested.

In FIG. 32, the third server shown is the Process Page—part 1 server 220. The Get Page and Process Page—part 1 can be easily remoted as server pairs to locations all over the web. This was done to allow the pair to be closer to the pages being spidered, for better performance and possible lower costs, and other considerations. This remoting and multiple occurance of the servers can apply to most if not all the servers in the search engine as well as servers shown in FIG. 32 that are not directly a part of the search engine. The Process Page—part 1 server 220 performs functions such as: parse each document (page) to strip off all ULR's found, all email addresses found, determine the home server and domain, sense type of page and attributes (color, font, pictures, objects, etc.), parse title, parse description, metatags, features, ranking assignments, look for spamming (hidden words, where the words are the same color as the background so a user will not see them but a spider will), parse computer code, html and other information. After the parsing is done, the processed files are compressed, to be sent to other servers. Some processed files may be sent as batches, such as email addresses to an email server system.

In FIG. 32, the fourth server shown is the Process Page—part 2 server 222. The Process Page—part 2 server 222 performs functions such as: uncompress data, save titles, save or create descriptions, parse all words, determine root words and exact words (horses is also horse, this greatly expands the words in a page), rank words, location of words, frequency of words, and other processing and operations. In this Process Page—part 2 222, one example of the present invention is use of the index technology to collect the word count and ranking of the words on the page and create a unique list of words on the page (document). For each document, a temporary index and word list is generated for the document, then as each word is parsed, it is added to the index and the word count and ranking is stored in the index. If this is the first time the word has been added to the index, the word is also added to a list. By the end of the document, a word list has been generated and the index for the list contains word count and ranking information. This is just one example of the use of the indexing technology as it relates to and improves the processing of data for a search engine. As each document is processed by Process Page—part 2 222, files are created for further processing. This server 222 interfaces to other servers and systems as needed, to provide functions and services.

In FIG. 32, the fifth server illustrated is the Word Index server 206. As discussed in detail for FIG. 30, the Word Index server 206 uses the Indexing technology of the present invention to build and maintain an index of words and their unique mathematical representation. The Word Index server 206 receives files from the Process Page—part 2 server 222 and performs functions such as: it takes the word list for each document and returns a unique numeric value to represent each word adding new words to the Word Index as they are discovered, (numeric values are substituted for words for most of the document), the document is then packaged up for further processing (title, URL, description, number of each word, relevance ratings, occurance of words, and other information). Files are created for further processing by other servers. The Word Index server 206 requests and performs other functions, such as interfacing with the user interface and other servers. Files from the Word Index server 206 are then sent to the URL Server 212.

In FIG. 32A, the URL server 212 receives files from the Word Index server 206, and after the URL server 212 updates its files from the Word Index server 206, it then creates files for the Split server 224.

In FIG. 32B, the Split server 224 receives files from the URL server 212. The split server 224 processes these files, and if the document is new, the split server 224 assigns the Process page server 210 (triplet of servers 210, 226, 208). If the document is pre-existing the split server 224 forwards the document to its current triplet PAD (Page, Archive, and Duplicate) 210, 226, 208 of servers. The Split server 224 allows for the search engine to add PAD's as the files grow, and for the search engine to re-balance the load on PAD's as the document (file) updates and users place loads on the search engine and the PAD's. The Split server 224 generates files that are further processed by the Triplet PAD's (the PAD's are in mated sets of three relate servers (triplets)). The Split server(s) 224 like all servers, have files, perform functions and services, and request and provide services to other servers.

In FIG. 32B, the Page server 210 receives it's files from the Split server(s), and based on records that are in the files for this Page server 210, the Page server 210 updates the existing information stored in the Page server 210 with the newer information if the document already exists, otherwise the information is added to the Page server 210. Some of the information contained in the Page server 210 is as follows: title, description, size in bytes, URL, URL-ID, last updated date, popularity information, relevance data, and other data and processing. Not all data stored in the Page server 210 is available to the user interface. The remaining words and their relevance and other data is placed into files for the related set Archive server. The Page server(s) 210 like all servers, have files, perform functions and services, and requests and provides services to other servers. For new pages, the Page server 210 generates files to be sent to the URL server 212.

In FIG. 32B, the Archive server 226 that is part of the PAD set, receives files from it's associated Page server 210. The Archive server 226 processes the files it receives, and performs some of the following functions:

If the document already exists in the Archive server 226, the Archive server 226 compares the new word list and each word's Relevance, as well as other data associated with the document to the existing word list (old words) of the document and each of the old word's relevance. For all new words and their relevance that differ from the old words or their relevance, a file is generated for the associated Duplicate server 208; old words that no longer exist in the newer version of the document are placed in a delete file, new words that now exist in the newer document with their relevance are placed in an add file, and words that have changed their relevance but still exist are placed in the delete file and then the add file with their relevance (an update function could be used in place of the delete and add procedure to achieve the same result).

If the document is new to the Archive server 226, then all the words and their relevance is also new, then all the new words and their relevance are placed in an add file (for the associated duplicate server 208).

If the document is being deleted from the Archive server 226, then all the existing words in the Archive server 226 for this document are placed in a delete file for the associated Duplicate server 208.

Lastly, if the document is being added or updated in the Archive server 226, all the new words and their associated relevance, plus other attributes and data relating to this document replaces the similar prior data stored in this document.

The Archive server 226 builds these files for its associated Duplicate server 208 that is part of the triplicate set. The Archive server(s) like all servers, have files, perform functions and services, and requests and provides services to other servers.

In FIG. 32B, the Duplicate server 208 that is preferably part of the PAD set, receives files from its associated Archive server 226. The Duplicate server 208 has lists of all words (remember all the words exist as their representative number in the Duplicate server 208) that exist in the associated Page and Archive servers 210, 226 in its set. For each word in each document (page), an entry exists containing the corresponding page, relevancy, ranking and other data. For example, user requests to find documents that contain some words (and optionally to exclude other words) are processed by the Duplicate server(s) 208. The Duplicate servers take the string of words requested and generate sets of pages that contain the words the user wants (and the pages exclude the words the user wants excluded). The sets of pages are sorted by relevancy, ranking and possibly other variables (date, etc.) and a final sorted list of pages is presented to the user interface (this was one example).

In addition to other requests, the Duplicate server 208 processes the archive files it receives, and performs some of the following functions:

It takes the delete word files first, locates the corresponding entries for that word and its attributes and other data and references to the associated page and deletes the entries from the Duplicate Server 208;

It then takes the add file and adds the words (if new) and then the associated attributes and page references.

FIG. 32B also shows other servers, some that are part of the Search Engine, For example: Advertising server, Instant document add server, Instant document update server, User Interface, and other servers that are and are not part of the search engine, but may still communicate with the servers of the search engine. Every server, file, service and function has not been depicted, just the basic components of the search engine and three uses of the indexing technology in the search engine (numerous others exist).

As discussed, FIG. 2 shows an uncompressed version of the index 12. At some point(s) within the index level structure, not all positions within the index array are populated. For example breaking out the index structure of the present invention to index the uncommon string "zxqylioceqiletz" may result in multiple levels of index arrays having many empty locations resulting in a waste of memory space (i.e., because there are not many or any word that contain the similar character string as "zxqylioceqiletz"). At some levels, a compressed index array with possible over flow chained entries will occupy less space (even considering the over flow addressing of chained blocks) than the array as shown in index 12. FIG. 33 represents another embodiment of an index array of the present invention using a binary map compression approach with a base index array 230 and subsequent overflow blocks 232 (as needed) to represent the index 12 in FIG. 2.

FIG. 33 shows an example of a compressed index array of the present invention. By using compression for the index blocks where efficient, and given the fact that the actual values being indexed are not stored in the index, the index's RAM Memory and disk storage becomes competitive in size with B-tree and other index technologies (while providing other significant advantages over these technologies, namely speed). In the example of FIG. 33, the compression technique uses a 48 bit binary map. The mask used for the bit map is (usually) the same positional map that is used for the basic indexing, that means that if the character "c" index entry would be in the third position of an index block, then the character "c" would be represented by the third bit in the bit map. The compression technique is comprised of: a bit map and positions for pointers, where the pointers may or may not be stored in the base index array 230.

In one embodiment of the "compressed" index structure, an additional overflow block 232 (usually just one) is chained to the base index array 230 to store additional pointers as needed. These overflow blocks may be of a predetermined length, e.g., 4 locations each comprised of 32 bits. Additional overflow blocks 232 may be chained to the prior overflow blocks 232 to accommodate additional pointers as needed. This technique should be considered where the number of index entries is expected to be less than full, yielding a savings in Ram memory and disk storage and this bit map compression technique is incorporated in the current Invention.

The space needed to store the index (Ram and Disk) grows (without compression) as the levels of the index increases, warranting the use of a compression technique at some level in the index. Speed considerations in the first several levels of the index usually outweigh the small storage savings that would be gained through compression in the first few levels of the index. After the first several levels of the index, based on the data being indexed, when the entries per index level decrease, the bit map compression technique, as described, is used (other compression techniques could also be used) to reduce the growth of index storage requirements as it relates to the growth of entries being indexed.

In the example in FIG. 33, the compression base array 230 contains a bit map of 48 positions (the positions corresponding to a predetermined character), a counter location 234 for tracking how many bits are turned on (speeds the process of counting all bits and helps in error checking, but is not necessary) and two positions 236 for pointers to additional indexes, where the last pointer position may also be used to point to another overflow block 232. If only 2 characters (or less) were represented by this base array 230, then 2 of the 48 bits would be set to a "1" and the other 46 bits of the 48 bit mask would be set to "0". The position of the "1"set bits represents the sequence of the pointers stored in the base array (and overflow blocks if applicable).

As an example, if we were looking for the pointer for character "k", we would first check to see if the bit representing "k" was set to "1". (For this example, we will assume that "k" does exist.) Since its position in the bit mask is set to "1", then the pointer for "k" is present in the pointer positions 236 in the base array 230 or an overflow block 232. Next we need to determine what position the "k" pointer represents in the sequence of pointers that are represented. Since all pointers are not normally represented, we count all the bits set to "1" up to and including "k" to determine what positional location to find the "k" pointer. For this example we will assume that "k" is the sixth bit turned on, and hence "k" pointer will be in the sixth pointer's position.

For this example embodiment, there are 128 bit long base and overflow blocks (i.e., arrays) and 32 bits are needed for each of the pointer locations in the base and overflow blocks which allows up to two pointer positions in a base array (and the 48 bit map), and up to four pointer positions in an overflow block. Since the "k" pointer plus the preceding number of pointers is 6 or greater, for this example, the second pointer 236 in the base array 230 is used to as a pointer to the first overflow block 232 (the last pointer of each overflow block 232 is either empty, a pointer to an over flowblock or the pointer for a character in the bit map). This leaves room in the base array 230 in pointer position 1 236, to store the pointer corresponding to the first character stored in the bit map. The second pointer position in the base array 230 for this example, is needed to point to the overflow block 232. (If there were only 2 characters represented by the bit map, the second pointer position in the base array 230 would contain the pointer value for the second character and no overflow block 232 would be needed.) The first overflow block 232 would contain three more pointers in the first three positions corresponding to the additional characters before "k" in the bit map (in their sequential order) and the fourth pointer position points to a second overflow block (not shown).

Figure 34B:
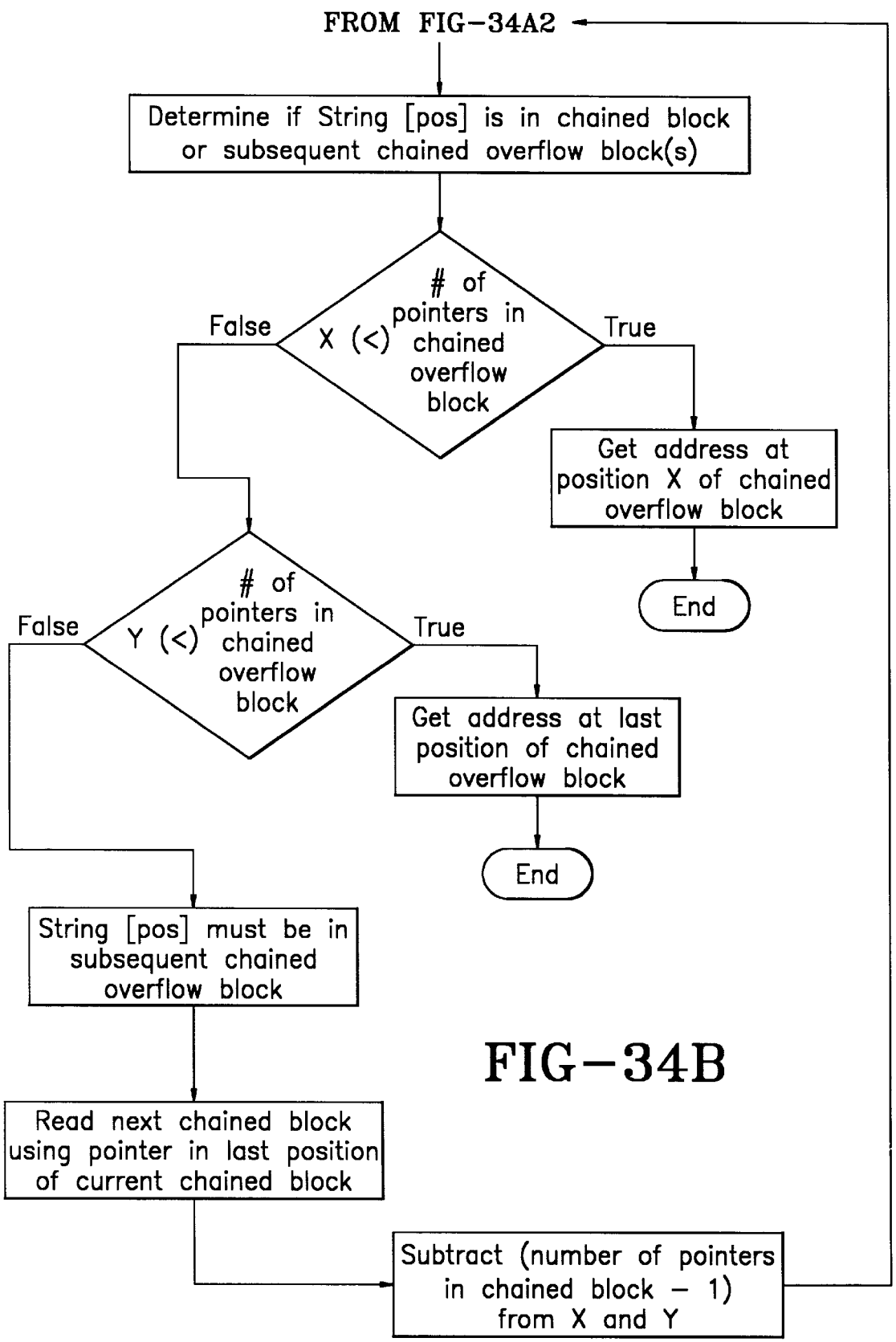

Accordingly, in the second overflow block in the second pointer position we would find the pointer corresponding to the sixth bit map position, i.e., the pointer for "k". This second overflow location could be the current end of the chain if eight or less characters were represented by the bit map. An typical index block (not compressed) would take 48×32 bits=1536 bits of storage (the bit map represented 48 characters) while in the example using compression 230, if 5 to 8 characters were present, 128 bits×3=384 bits of storage were needed FIGS. 34A and 34B illustrate a flowchart of one embodiment of the present invention were compressed index arrays are used for data retrieval. With regard to FIGS. 34A and 34B, assume that the data has been indexed according to the compressed indexing structure as described with reference to FIG. 33. As shown in FIG. 34A, let us assume that we are looking for string of characters in the indexed structure where one character is denoted by String [pos] (the character of the string at position pos). It is also preferred that the value of String [pos] is the position of the BITMAP. Accordingly, for FIG. 34A, the value of BITMAP [string [pos]] is the valued stored in the BITMAP corresponding to the String[pos] position. If the value returned is a "0" block 240, that particular data item is not found in the index 242. If the value returned is "1", there is a corresponding record. To find the position of the next index level, the pointer needs to be retrieved. To determine which location of the compressed index array stores the pointer for the String[pos] location, the bits from the BITMAP from position to 0 to the String [pos] are scanned. These bits are counted to determine the position (X) of the pointer in either the base array 230 or the overflow arrays 232 (see block 248 in FIG. 34A). Accordingly, the location of the next index array can be retrieved.

FIGS. 35A and 35B represent one example index structure of the present invention where the index structure has one word—"cab".

It should be understood that the term "server" as it used herein should be used in the broadest sense. Servers are specific applications that serve to achieve a particular purpose, these servers may be located on separate hardware devices or on the same machine as other servers. It should also be understood that the servers may be combined to form a unitary server for accomplishing all the various functions described in accordance with the present invention.

In an alternative embodiment, the first level of the index is a record that contains the terminating lengths of all items being indexed. Each individual terminating length points to an index of all values that have that termination length. This is another embodiment of the current invention, where the terminating character is moved from the last position of the string to be indexed, to now be represented as a value in the first position representing the length of the string.

Thus, many of the elements indicated above may be altered or replaced by different elements which will provide the same result and will fall within the spirit of the claimed invention. It is the intention, therefore, to limit the invention only as indicated by the scope of the claims.

What is claimed is:

1. A method for storing data for rapid retrieval, comprising the steps of:
   creating a plurality of index arrays having locations wherein said locations are associated with a character or group of characters;
   providing a record file for storing a plurality of data items, each of said data items having a string of characters, wherein said locations of said plurality of index arrays are adapted to store either a pointer to a second index array or a second data item and wherein at least one of said plurality of index arrays is adapted to store a pointer to another database indexing structure;
   indexing a first predetermined portion of each of said plurality of data items in said plurality of index arrays;
   pointing to said another database indexing structure;
   indexing a second predetermined portion of each of said plurality of data items in said another database indexing structure; and
   wherein said another database indexing structure is a B-tree indexing structure.

2. A method according to claim 1 wherein said another database indexing structure is a hash indexing structure.

3. A method of indexing a collection of data objects, wherein a tree index structure is used in combination with a predetermined second indexing structure, comprising the steps of:
   creating a first level index array;
   expanding the levels of said tree index structure to a plurality of additional layers of index arrays and wherein said first level index array and each of said index arrays in said plurality of additional layers of index arrays have a plurality of locations corresponding to at least one character of a predetermined list of characters;
   indexing a first predetermined portion of a data object in said first level index array and in each of said plurality of additional layers of index arrays;
   pointing to said predetermined second indexing structure;
   indexing a second portion of said data object in said second indexing structures; and
   wherein said second indexing structure is a B-tree indexing structure.

4. A hybrid indexing structure for indexing a plurality of data objects comprising:
   a plurality of index segments, said plurality of index segments having locations associated with a character or group of characters, and wherein said locations of said index segments are adapted to store either a pointer to another index segment or a second data element;
   a second database structure pointed to by at least one location of one index segment;
   wherein a first portion of each of said plurality of data objects are indexed by said plurality of index segments and a second portion of each of said plurality of data objects are indexed by said second database structure; and
   wherein said second database structure is a B-tree structure.

5. A system according to claim 4 wherein said second data element is a pointer to one of said plurality of data objects.

6. A system according to claim 4 wherein said second data element is a pointer to said second database structure.

7. A system according to claim 4 wherein each one of said index segments corresponds to a predetermined character position of said data objects.

8. A hybrid indexing structure for indexing a plurality of data objects comprising:
   a first database structure;
   a plurality of layers of index segments, each of said index segments having locations wherein each of said locations are associated with a character, and wherein said locations of said index segments are adapted to store either a pointer to another index segment or a second data element, wherein said first database structure points to said at least one of said index segments from said plurality of layers of index segments;
   wherein a first portion of each of said plurality of data objects are indexed by said first database structure and wherein a second portion of each of said plurality of data objects are indexed by said plurality of layers of index segments; and
   wherein said first database structure is a B-tree structure.

9. An indexing process for use in Internet search engines, comprising the steps of:
   retrieving a collection of data items from the Internet, said collection of data items associated with an address;
   indexing said data items, said indexing further comprising the steps of:
   a. creating a plurality of index arrays, each of said index arrays having locations wherein each of said locations is associated with a character or group of characters;
   b. indexing a first predetermined portion of each of said plurality of data items in said plurality of index arrays;
   c. configuring at least one of said index arrays with a reference for each unique data item, said reference used to locate an address associated with each of said indexed data items; and
   d. wherein said reference is stored in a terminating character position of one of said index arrays.

10. An indexing process according to claim 9, wherein a first level index array corresponds to a first character of said data items to be indexed and wherein a second level index array corresponds to a second character of said data items to be indexed.

11. An indexing process according to claim 9, wherein said reference is a unique numerical value associated with a corresponding unique data item.

12. An indexing process according to claim 11, further comprising the step of:
associating each of said unique numerical values with all addresses of said collections of data items containing said data item referenced by said unique numerical value.

13. An indexing process according to claim 12, wherein said collection of data items is a web page and wherein said address is a URL.

14. An indexing process according to claim 9, wherein said reference is a record location for a record containing addresses of all collections of data items containing said data item.

15. An indexing process according to claim 9, wherein said address is a URL.

16. An indexing process according to claim 9, further comprising:
providing a separate index structure for each of said URLs of said collection of data items retrieved.

17. An indexing process for use in Internet search engines, comprising the steps of:
retrieving a Web page from said Internet, including a URL associated with said retrieved Web page;
indexing data items from said Web page, said indexing further comprised of the steps of:
a. creating an index structure by creating a plurality of index arrays, each of said index arrays having locations wherein each of said locations is associated with a character or group of characters, wherein said locations of said plurality of index arrays are adapted to store either a pointer to another index array or a second data element;
b. associating a unique reference for each unique data item in said index structure;
associating each of said unique references to Web pages containing said unique data items; and
wherein said unique reference for each unique data item is stored in a terminating character position of said index structure.

18. An indexing process according to claim 17, wherein said unique reference is a number.

19. An indexing process according to claim 22, further comprising the step of:
expanding said index structure to accommodate all unique combinations of said characters or group of characters.

20. An indexing process according to claim 17 wherein at least one of said plurality of index arrays stores pointer to another database indexing structure.

21. A method for indexing Internet pages for subsequent searching and retrieval, said method comprising:
providing a first index structure, said index structure having a plurality of index arrays, wherein each of said index arrays has a predetermined number of locations and wherein each of said locations is associated with a character and, wherein one of said locations of each of said index arrays corresponds to a terminating character reference;
obtaining a first data item from a first Internet page;
determining a first character of said first data item;
placing a pointer to a second level index array in a location of a first level index array corresponding to said first character;
indexing the remaining characters of said first data item in said index structure;
placing a pointer to a last index array in an index array and index location corresponding to a last character of said first data item; and placing a reference value in a terminating character location of said last index array, wherein said reference value is used to retrieve the location of the Internet page.

22. A method according to claim 21, wherein said reference value is a unique numerical value assigned to said first data item.

23. A method according to claim 21, further comprising the step of:
using said reference value to look up all locations of Internet pages containing said first data item.

24. A method according to claim 21, wherein said location of said Internet pages are URLs.

25. A method according to claim 24, further comprising the step of:
providing a second index structure for indexing all retrieved URLs.

26. A method according to claim 25, wherein a URL reference value is assigned to each indexed URL.

27. An index structure for indexing data items retrieved from an Internet web page, said index structure comprised of:
a plurality of index arrays, said index arrays having a predetermined number of locations and wherein each of said locations is associated with at least one character;
wherein said locations of said index arrays are adapted to hold a pointer to another index array or another data element;
wherein said data element is a reference value used to retrieve locations of Internet pages;
wherein said reference value is a unique numerical value assigned to a unique data item indexed in said index structure; and
wherein said unique numerical value for each unique data item is stored in a terminating character location of an index array.

28. An index structure according to claim 27, wherein said character may be any character or symbol that may be found on a web page.

29. An index structure according to claim 27, wherein said unique numerical value is used to retrieve all locations of web pages containing the unique data item assigned to said unique numerical value.

30. An index structure according to claim 27, wherein said reference value used to retrieve locations of said Internet pages is stored in a terminating character location of an index array.

31. An index structure according to claim 30, wherein said terminating character for each unique data item follows the last character of said data item.

32. An index structure for indexing a data item, comprising:
a first index array, said first index array further comprised of:
a. a first portion having a predetermined number of locations, each of said locations corresponding to a predetermined character or group of characters;
b. a first pointer location for storing a pointer to another index array or a reference value, wherein said reference value is used to locate web pages containing the data item; and
c. wherein said first pointer and said first pointer location are located in non-continuous locations in memory.

33. An index structure according to claim 32, wherein said first portion stores a "1"bit in a location to represent a "full" value.

34. An index structure according to claim 32, wherein said first index array is further comprised of a second pointer location and wherein said second pointer location is adapted to store a pointer to another index array or to an overflow pointer array.

35. An index structure according to claim 34, wherein said overflow pointer array is adapted to store a pointer to another index array or another overflow pointer array.

36. An engine utilizing said index structure of claim 32 for indexing data retrieved from Internet web pages.

37. An engine according to claim 36 wherein URL associated with each of said Internet web pages are indexed in a separate index structure.

38. An index structure according to claim 32, wherein said first index array is further comprised of a counter location for tracking the number of set bits stored in said bitmap portion.

39. An index array according to claim 32, wherein the number of pointers to other index arrays corresponds to the number of set bits in said first portion.

40. An index array according to claim 39, wherein the first location of said first portion of said index array (from leftmost most position to rightmost position) that is "full" is associated with a pointer stored in the first pointer location.

41. An index array according to claim 32 wherein one of said locations in said first portion relates to a terminating character value.

42. An index array according to claim 32 wherein said index structure indexes data retrieved from the Internet allowing subsequent search and retrieval.

43. An index array according to claim 32, wherein said reference value is a location in memory for storing references to Web pages.

44. An index structure for indexing a data item, comprising:

a first index array, said first index array further comprised of:
   a. a first portion having a predetermined number of locations, each of said locations corresponding to a predetermined character or group of characters;
   b. a first pointer location for storing a pointer to another index array or a reference value, wherein said reference value is used to locate web pages containing the data item; and
   c. wherein one of said locations in said first portion relates to an unknown character.

45. An index structure for indexing a data item, comprising:

a first index array, said first index array further comprised of:
   a. a first portion having a predetermined number of locations, each of said locations corresponding to a predetermined character or group of characters;
   b. a first pointer location for storing a pointer to another index array or a reference value, wherein said reference value is used to locate web pages containing the data item; and
   c. wherein said reference value is a unique numerical value assigned to a particular data string.

46. An index structure for indexing a data item, comprising:

a first index array, said first index array further comprised of:
   a. a first portion having a predetermined number of locations, each of said locations corresponding to a predetermined character or group of characters;
   b. a first pointer location for storing a pointer to another index array or a reference value, wherein said reference value is used to locate web pages containing the data item; and
   c. wherein said first portion is a bitmap portion.

* * * * *